United States Patent
Pinnawala et al.

(10) Patent No.: US 11,898,100 B2
(45) Date of Patent: Feb. 13, 2024

(54) COMPOSITIONS AND METHODS FOR BREAKING FOAMS AND EMULSIONS

(71) Applicant: Chevron U.S.A. Inc., San Ramon, CA (US)

(72) Inventors: Gayani W. Pinnawala, Houston, TX (US); Sujeewa S. Palayangoda, Houston, TX (US); Varadarajan Dwarakanath, Houston, TX (US); Mohamad Salman, Houston, TX (US); Mohsen S. Tagavifar, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 250 days.

(21) Appl. No.: 17/121,333

(22) Filed: Dec. 14, 2020

(65) Prior Publication Data
US 2021/0179930 A1    Jun. 17, 2021

Related U.S. Application Data

(60) Provisional application No. 62/948,258, filed on Dec. 14, 2019.

(51) Int. Cl.
*C09K 8/86* (2006.01)
*C10G 33/04* (2006.01)

(52) U.S. Cl.
CPC ............ *C09K 8/86* (2013.01); *C10G 33/04* (2013.01); *C09K 2208/26* (2013.01)

(58) Field of Classification Search
CPC ....... C09K 8/86; C09K 2208/26; C10G 33/04
See application file for complete search history.

(56) References Cited

U.S. PATENT DOCUMENTS

| | | | |
|---|---|---|---|
| 3,811,504 A | 5/1974 | Flournoy et al. | |
| 3,811,505 A | 5/1974 | Flournoy et al. | |
| 3,811,507 A | 5/1974 | Flournoy et al. | |
| 3,890,239 A | 6/1975 | Dycus et al. | |
| 4,463,806 A | 8/1984 | Hurd | |
| 5,488,148 A | 1/1996 | Weerasooriya et al. | |
| 6,022,843 A | 2/2000 | Shank et al. | |
| 6,225,267 B1 | 5/2001 | Eckard et al. | |
| 6,417,142 B1 * | 7/2002 | Chatterji ................ C04B 24/00 507/265 |
| 7,629,299 B2 | 12/2009 | Berger et al. | |
| 7,770,641 B2 | 8/2010 | Dwarakanath et al. | |
| 8,211,837 B2 | 7/2012 | Weerasooriya et al. | |

(Continued)

FOREIGN PATENT DOCUMENTS

| WO | 2008/079855 | 7/2008 |
|---|---|---|
| WO | 2011/094442 | 8/2011 |
| WO | 2012/027757 | 3/2012 |

OTHER PUBLICATIONS

Abdurahman H. N., and M. Nuraini "Chemical Destabilization on Water in Crude Oil Emulsions", International Scholarly and Scientific Research & Innovation 4(2) 2010, 217-220.

(Continued)

*Primary Examiner* — Alicia Bland
(74) *Attorney, Agent, or Firm* — Meunier Carlin & Curfman LLC

(57) ABSTRACT

Disclosed herein are methods and composition for breaking foam, emulsions, or any combination thereof.

19 Claims, 22 Drawing Sheets

(56) References Cited

U.S. PATENT DOCUMENTS

| | | |
|---|---|---|
| 9,422,469 B2 | 8/2016 | Dwarakanath et al. |
| 9,605,198 B2 | 3/2017 | Shong et al. |
| 9,617,464 B2 | 4/2017 | Dwarakanath et al. |
| 9,840,898 B2 | 12/2017 | Kasevich et al. |
| 9,890,627 B2 | 2/2018 | Kasevich et al. |
| 9,976,072 B2 | 5/2018 | Dwarakanath et al. |
| 2005/0199395 A1 | 9/2005 | Berger et al. |
| 2006/0185845 A1 | 8/2006 | Shpakoff et al. |
| 2006/0189486 A1 | 8/2006 | Shpakoff et al. |
| 2007/0191633 A1 | 8/2007 | Berger et al. |
| 2009/0112014 A1 | 4/2009 | Campbell et al. |
| 2009/0270281 A1 | 10/2009 | Steinbrenner et al. |
| 2010/0004843 A1 | 1/2010 | Yu et al. |
| 2010/0292110 A1 | 12/2010 | Pope et al. |
| 2010/0319920 A1 | 12/2010 | Pope et al. |
| 2011/0046024 A1 | 2/2011 | Campbell et al. |
| 2011/0048721 A1 | 3/2011 | Pope et al. |
| 2011/0059872 A1 | 3/2011 | Weerasooriya et al. |
| 2011/0059873 A1 | 3/2011 | Weerasooriya et al. |
| 2011/0071057 A1 | 3/2011 | Weerasooriya et al. |
| 2011/0100402 A1 | 5/2011 | Soane et al. |
| 2011/0190174 A1 | 8/2011 | Weerasooriya et al. |
| 2011/0190175 A1 | 8/2011 | Steinbrenner et al. |
| 2011/0201531 A1 | 8/2011 | Sharma et al. |
| 2011/0257051 A1* | 10/2011 | Welton .................. C09K 8/502 507/233 |
| 2014/0213668 A1* | 7/2014 | Meyer .................. C07D 307/20 549/478 |
| 2014/0288909 A1 | 9/2014 | Prestwood et al. |
| 2016/0281494 A1 | 9/2016 | Shirdel et al. |
| 2017/0066881 A1* | 3/2017 | Rose .................. C08G 73/024 |
| 2017/0198202 A1 | 7/2017 | Shong et al. |
| 2018/0079949 A1* | 3/2018 | Mahmoudkhani .... C04B 18/146 |
| 2018/0202273 A1 | 7/2018 | Kasevich et al. |
| 2018/0265773 A1* | 9/2018 | Zhang .................. C09K 8/88 |
| 2021/0002444 A1 | 1/2021 | Dwarakanath et al. |
| 2021/0002544 A1 | 1/2021 | Hahn et al. |
| 2021/0002990 A1 | 1/2021 | Mosrey et al. |
| 2021/0002991 A1 | 1/2021 | Morey et al. |

OTHER PUBLICATIONS

Salager J-L, "The fundamental basis for the action of a chemical dehydrant. Influence of the physical and chemical formulation on the stability of an emulsion", International Chemical Engineering 1990, 30, 103-116.

Barnes, Julian Richard, et al. "Application of internal olefin sulfonates and other surfactants to EOR. Part 1: Structure-Performance relationships for selection at different reservoir conditions." SPE improved oil recovery symposium. Society of Petroleum Engineers, 2010. Paper No. SPE-129766-MS.

* cited by examiner

• 90% of 0.2% surfactant solution in injection brine + 10% oil

Sample mixer

After 5 min in 40C

After 3 min in 71C

Only using 0.2% 4-methyl-2-pentanol
- improved oil layer over time
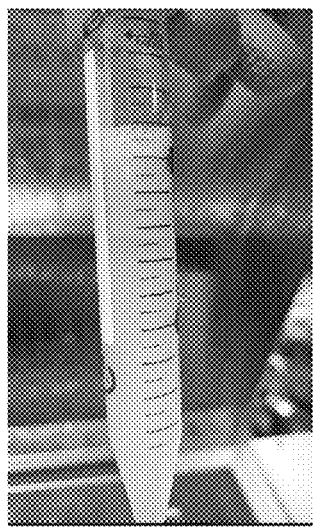 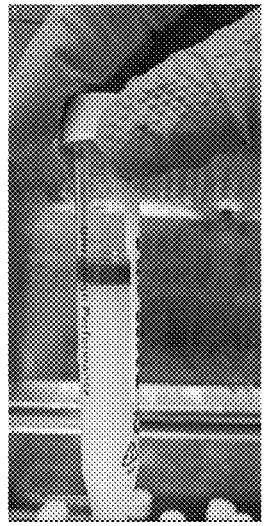 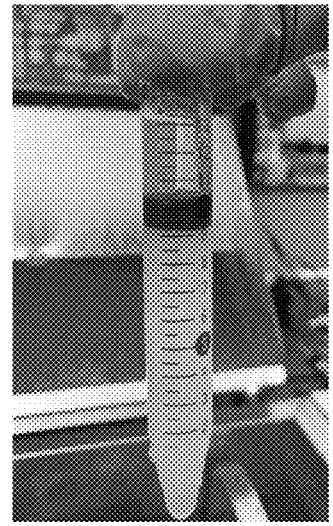
After 0 min at 40C     After 1 min at 40C     After 3 min at 40C
FIG. 9
IPA vs 4-methyl-2-pentanol
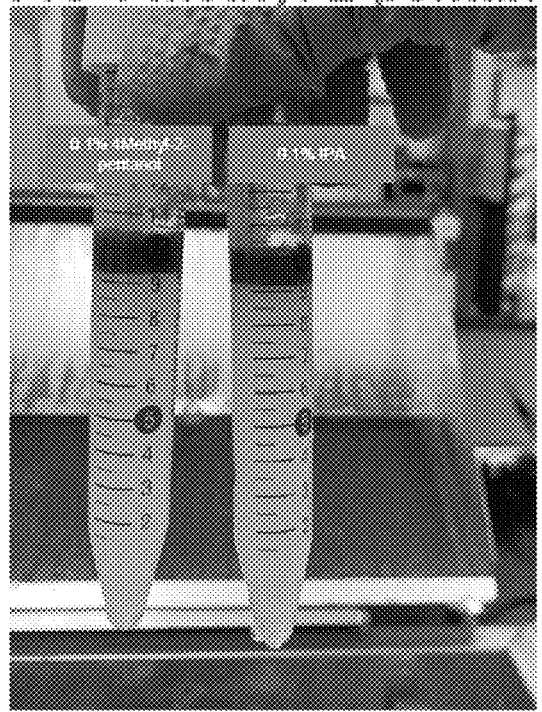
After 5 min at 40C
FIG. 10

Emulsion + foam at 40C      After adding defoamer at 40C
FIG. 11
Only using 4-methyl 2-pentanol
- emulsion breaking over time with different concentrations of 4-methyl 2-pentanol
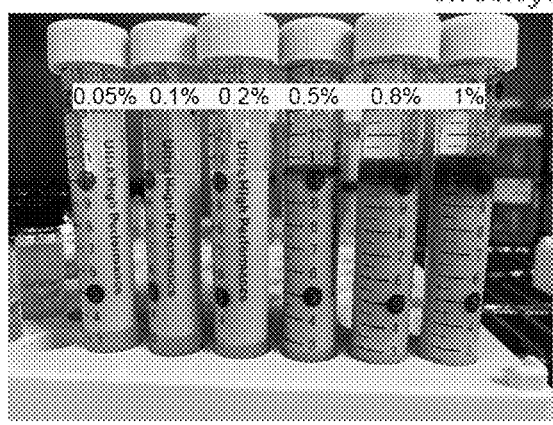
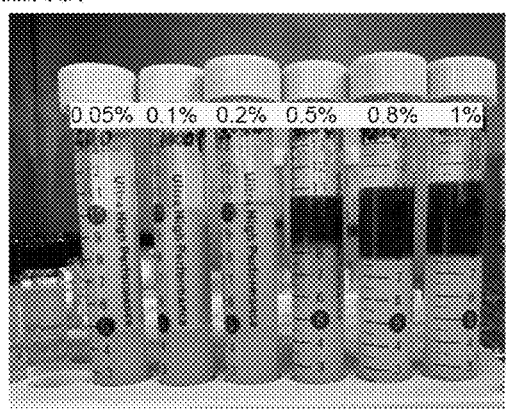
After 5 min in 71C      After 10 min in 71C
FIG. 12

Tested Partitioning Agents

| | |
|---|---|
| C9-11-2.5EO | Ethanol |
| 4-Methyl-2-Pentanol | Methanol |
| C9-11-2.5EO and 4-Methyl-2-Pentanol mixture | N-amyl alcohol |
| Isopropyl alcohol | Decyl alcohol |
| Ethylene Glycol monobutyl Ether | Polyethylene glycol 600 |
| Triethylene glycol monobutyl Ether | Polyethylene glycol 400 |
| Diethylene Glycol Butyl Ether | Polyethylene glycol 200 |
| Propylene Glycol Butyl Ether | Polypropylene glycol 2000 |
| Ethylene Glycol Monophenyl Ether | Polypropylene glycol 725 |
| Phenol-2EO | 2-methyl-2-propanol |
| Phenol-4EO | Oleyl Alcohol |
| Phenol-1PO-2EO | |
| Phenol-2PO-2EO | |
| IBA 5EO | |

FIG. 13

Using C9-11-2.5EO as an Emulsion Breaker for Emulsion made using 0.2% surfactant formulation #1 with 10% oil

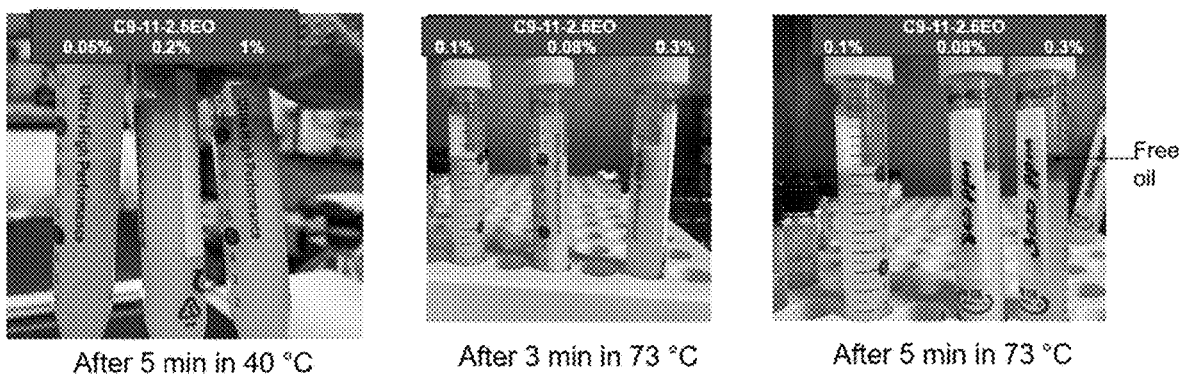

After 5 min in 40 °C     After 3 min in 73 °C     After 5 min in 73 °C

FIG. 14

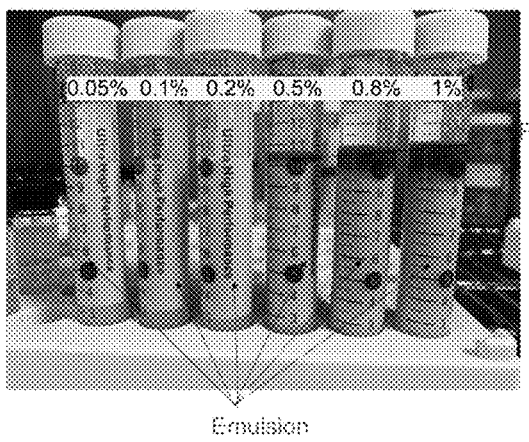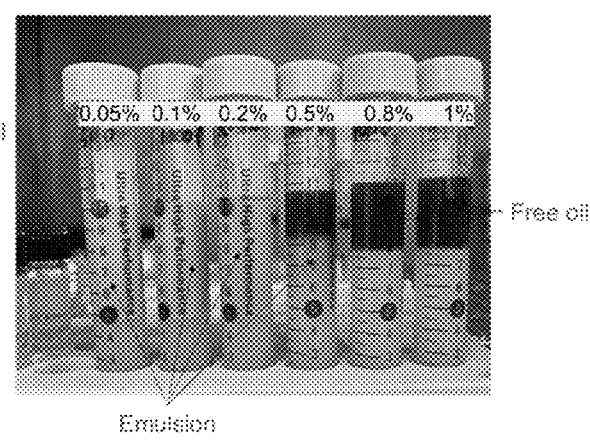
Composition: 30% oil, 0.2% surfactant formulation #1, brine #1
FIG. 18

Composition: 0.2% surfactant formulation #1 and 20% Oil #1 at 40 °C, brine #1, 5000ppm demulsifier Partition Coefficient (Log $K_{OW}$) of Co-solvents in Octanol/water System Experimental Data

| Temp. °C | EGBE | | 4-Methyl-2-pentanol | | Phenol-2PO-2EO | |
|---|---|---|---|---|---|---|
| | DI | Brine | DI | Brine | DI | Brine |
| RT | 0.725 | 0.981 | 1.526 | 1.885 | 1.46 | 1.730 |
| 40 | 0.961 | 1.205 | 1.701 | 2.031 | 1.508 | 1.740 |
| 70 | 1.11 | 1.371 | 1.750 | 2.055 | 1.508 | 1.730 |

Literature Reported Data

| Chemical | Partition Coefficient at RT |
|---|---|
| Ethanol | -0.16 |
| Methanol | -0.52 |
| PEG 200 | -2 |
| PEG 400 | -3 |
| TEGBE | 0.51 |
| EGBE | 0.83 |
| 4-Methyl-2-pentanol | 1.43 |
| Oleyl alcohol | 7.5 |

FIG. 31

COMPOSITIONS AND METHODS FOR BREAKING FOAMS AND EMULSIONS

CROSS-REFERENCE TO RELATED APPLICATIONS

This application claims benefit of priority of U.S. Provisional Application No. 62/948,258 filed Dec. 14, 2019, which is incorporated herein by reference herein in its entirety.

BACKGROUND

Emulsions and foams can be formed during hydrocarbon recovery and processing. In the case of emulsions, there is often a desire to break these emulsions to separate the hydrocarbon phase for processing and use in downstream applications. Likewise, there is often a need to break foams during the course of hydrocarbon recovery and processing. To accomplish these ends, improved compositions and methods for breaking foams and emulsions are needed.

The compositions and methods described herein address these and other needs.

SUMMARY

Provided herein are methods and compositions for breaking a foam, an emulsion, or any combination thereof. Methods for breaking a foam, an emulsion, or any combination thereof can comprise contacting the foam, the emulsion, or any combination thereof with a breaking composition comprising a partitioning agent. In some embodiments, the partitioning agent can have an octanol/water partition coefficient ([P]) at 25°, and the log of the partition coefficient at 25° (log[P]) can be from 0.1 to 5. In some embodiments, the partitioning agent has a dielectric constant of from 1 to 50.

In some embodiments, the partitioning agent comprises an alcohol, an ether, a non-ionic surfactant, or any combination thereof. In certain embodiments, the partitioning agent can comprise an alcohol (e.g., a branched C3-C10 alcohol). In some examples, the alcohol can comprise hexanol (e.g., n-hexanol), isopropanol, 2-ethylhexanol (e.g., 2-ethyl-1-hexanol), 4-methyl-2-pentanol (also known as methylisobutyl carbinol), benzyl alcohol, isobutanol, sec-butanol, tert-butanol, pentaerythritol, ethylene glycol, or any combination thereof.

In some embodiments, the partitioning agent can comprise an ether, such as alkyl ethoxylate. In some examples, the ether can comprise ethylene glycol butyl ether (EGBE), diethylene glycol monobutyl ether (DGBE), triethylene glycol monobutyl ether (TEGBE), ethylene glycol dibutyl ether (EGDE), propylene glycol butyl ether, ethylene glycol monophenyl ether, phenol-2EO, phenol-4EO, phenol-1PO-2EO, phenol-2PO-2EO, or any combination thereof.

In some embodiments, the partitioning agent can comprise a non-ionic surfactant, such as an alkyl ethoxylate surfactant.

In some embodiments, the breaking composition can further comprise one or more defoamers, demulsifiers, or any combination thereof. In some examples, the one or more defoamers, demulsifiers, or any combination thereof can comprise an oil-based defoamer, a water-based defoamer, a silicone-based defoamer, an alkyleneoxy-based defoamer, a polyacrylate defoamer, a ketone-based defoamer, a phenol-formaldehyde resins such as an acid-catalyzed phenol-formaldehyde resin or a base-catalyzed phenol-formaldehyde resin, an epoxy resin, a polyamines such as a polyamine polymers, a polyol, a di-epoxide, a dendrimer, a star polymer, a zwitterionic surfactant, a cationic surfactant, or a combination thereof.

In some embodiments, the foam, the emulsion, or any combination thereof is present on or within equipment associated with an oil and gas operation. In some examples, the equipment associated with an oil and gas operation can comprise a vessel, pipeline, holding tank, separator, pipe, wellbore, wellhead, or any combination thereof.

In some examples, the foam, the emulsion, or any combination thereof can be present in a pipe, in a pipeline, in a wellhead, or any combination thereof, and the method can comprise injecting the breaking composition into the pipe, into the pipeline, into the wellhead or any combination thereof. In some embodiments, the method comprises continuously injecting the breaking composition. In some embodiments, the method comprises one or more discrete injections of the breaking composition.

In some examples, the foam, the emulsion, or any combination thereof can be present in a pipe, in a pipeline, in a wellhead, or any combination thereof, and the method can comprise injecting the breaking composition into the pipe, into the pipeline, into the wellhead or any combination thereof. In some embodiments, the method comprises continuously injecting the breaking composition. In some embodiments, the method comprises one or more discrete injections of the breaking composition.

In some examples, the foam, the emulsion, or any combination thereof can be present in a separator, and the method can comprise injecting the breaking composition into the separator, injecting the breaking composition upstream of the separator, injecting the breaking composition downstream of the separator, or any combination thereof. In some embodiments, the method comprises continuously injecting the breaking composition. In some embodiments, the method comprises one or more discrete injections of the breaking composition.

In some embodiments, the foam, the emulsion, or any combination thereof can comprise a produced fluid. In some embodiments, the produced fluid comprises an aqueous component, a hydrocarbon component, and one or more surfactants. In some embodiments, the one or more surfactants can comprise one or more non-ionic surfactants, one or more anionic surfactants, one or more cationic surfactants, one or more zwitterionic surfactants, or any combination thereof.

Also provided are breaking compositions for use in breaking foams and emulsions. The breaking compositions can comprise a partitioning agent and one or more defoamers, demulsifiers, or any combination thereof. The partitioning agent can have an octanol/water partition coefficient ([P]) at 25°, and the log of the partition coefficient at 25° (log[P]) can be from 0.1 to 5, such as from 0.1 to 3, from 0.1 to 2, from 0.1 to 1.5, from 0.1 to 1, from 0.1 to 0.8, or from 0.1 to 0.7.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

FIG. 9 includes images illustrating the results of using only 0.2% 4-methyl 2-pentanol as partitioning agents, at 40° C. The images were taken after 0, 1, and 3 minutes.

FIG. 10 is an image illustrating the results of using IPA versus 4-methyl-2-pentanol as partitioning agents, at 40° C. The images were taken after 5 minutes.

FIG. 11 includes images illustrating a sample emulsion composition before and after adding defoamer at 40° C.

FIG. 12 includes images illustrating using only different concentration 4-methyl-2-pentanol as partitioning agent over time at 71° C.

FIG. 13 is a table of the partitioning agents tested in Example 3.

FIG. 14 includes images illustrating the results of using C9-11-2.5EO as partitioning agent for sample emulsion compositions including: 0.2% surfactant formulation #1 with 10% oil. The demulsifier was tested at different concentrations and temperatures (40° C. and 73° C.) and images were taken after 3 minutes and 5 minutes.

FIG. 18 includes images illustrating the results of using different concentrations of 4-Methyl-2-Pentanol as partitioning agent for a sample emulsion composition including 30% oil, 0.2% surfactant formulation #1, brine #1.

FIG. 31 includes tables showing the partition coefficient ($logK_{ow}$) of co-solvents in Octanol/water system.

Like reference symbols in the various drawings indicate like elements.

DETAILED DESCRIPTION

Figure 1:
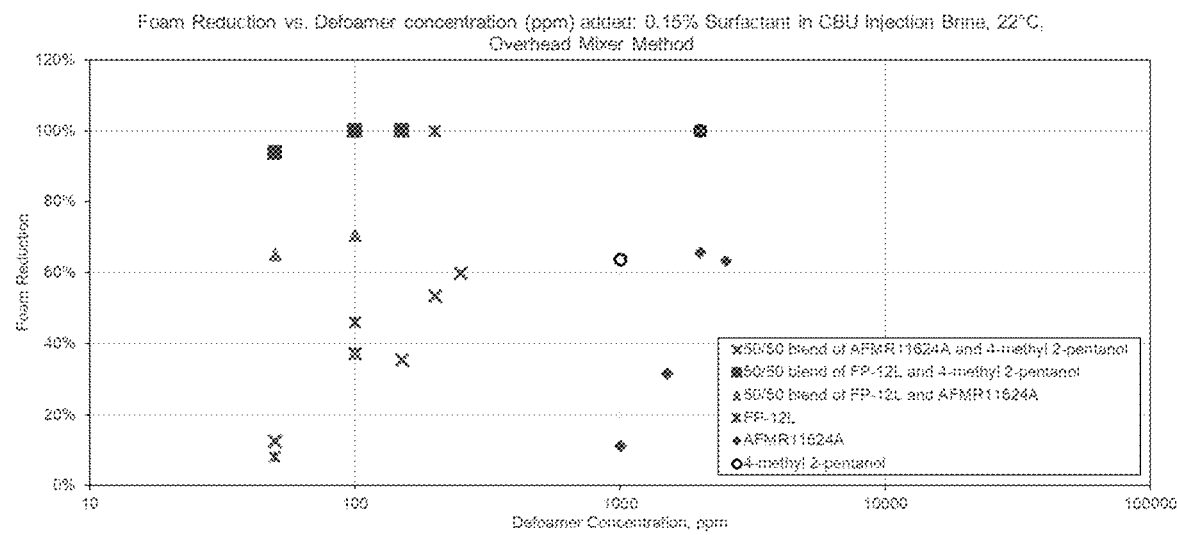
FIG. 1 is a graph of the foam reduction versus defoamer concentration (ppm) when added to 0.15% surfactant in injection brine, at 22° C., using overhead mixer method.
Figure 2:
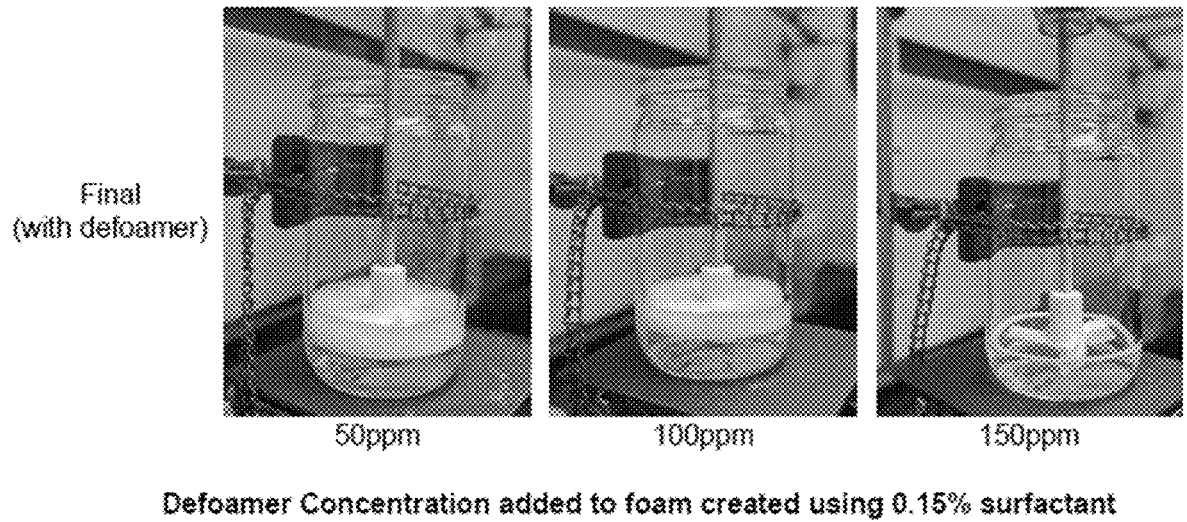
FIG. 2 includes images illustrating the results of a 50/50 blend of defoamer 2 and defoamer 1.
Figure 3:
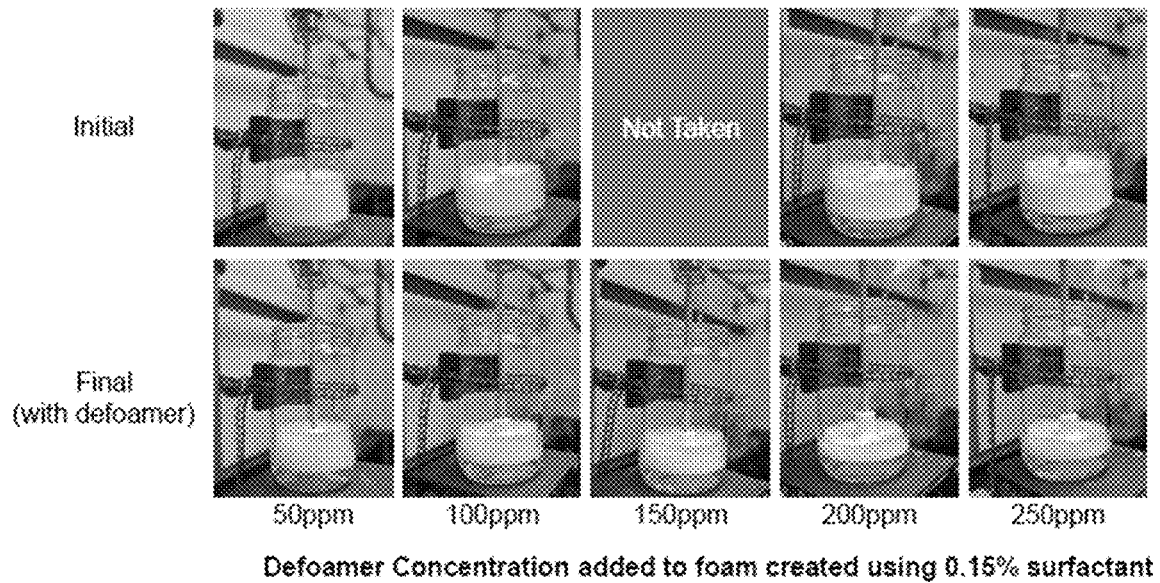
FIG. 3 includes images illustrating the results of a 50/50 blend of defoamer 2 and 4-methyl 2-pentanol.

Described herein are methods for breaking a foam, emulsion, or any combination thereof. The methods can comprise contacting the foam, emulsion, or any combination thereof with a breaking composition. The breaking composition can comprise a partitioning agent and optionally one or more defoamers, demulsifiers, or any combination thereof.

Also described are breaking compositions that can comprise a partitioning agent and optionally one or more defoamers, demulsifiers, or any combination thereof.

Definitions

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) can include 10% and also includes 20%, and includes percentages in between 10% and 20%, unless explicitly stated otherwise herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

The term "hydrocarbon" refers to a compound containing only carbon and hydrogen atoms.

"Hydrocarbon-bearing formation" or simply "formation" refers to the rock matrix in which a wellbore may be drilled. For example, a formation refers to a body of rock that is sufficiently distinctive and continuous such that it can be mapped. It should be appreciated that while the term "formation" generally refers to geologic formations of interest, that the term "formation," as used herein, may, in some instances, include any geologic points or volumes of interest (such as a survey area). Hydrocarbon-bearing formations can be "unconventional formations" or "conventional formations."

An "unconventional formation" is a subterranean hydrocarbon-bearing formation that generally requires intervention in order to recover hydrocarbons from the reservoir at economic flow rates or volumes. For example, an unconventional formation includes reservoirs having an unconventional microstructure in which fractures are used to recover hydrocarbons from the reservoir at sufficient flow rates or volumes (e.g., an unconventional reservoir generally needs to be fractured under pressure or have naturally occurring fractures in order to recover hydrocarbons from the reservoir at sufficient flow rates or volumes).

In some embodiments, the unconventional formation can include a reservoir having a permeability of less than 25 millidarcy (mD) (e.g., 20 mD or less, 15 mD or less, 10 mD or less, 5 mD or less, 1 mD or less, 0.5 mD or less, 0.1 mD or less, 0.05 mD or less, 0.01 mD or less, 0.005 mD or less, 0.001 mD or less, 0.0005 mD or less, 0.0001 mD or less, 0.00005 mD or less, 0.00001 mD or less, 0.000005 mD or less, 0.000001 mD or less, or less). In some embodiments, the unconventional formation can include a reservoir having a permeability of at least 0.000001 mD (e.g., at least 0.000005 mD, at least 0.00001 mD, 0.00005 mD, at least 0.0001 mD, 0.0005 mD, 0.001 mD, at least 0.005 mD, at least 0.01 mD, at least 0.05 mD, at least 0.1 mD, at least 0.5 mD, at least 1 mD, at least 5 mD, at least 10 mD, at least 15 mD, or at least 20 mD).

The unconventional formation can include a reservoir having a permeability ranging from any of the minimum values described above to any of the maximum values described above. For example, in some embodiments, the unconventional formation can include a reservoir having a permeability of from 0.000001 mD to 25 mD (e.g., from 0.001 mD to 25 mD, from 0.001 mD to 10 mD, from 0.01 mD to 10 mD, from 0.1 mD to 10 mD, from 0.001 mD to 5 mD, from 0.01 mD to 5 mD, or from 0.1 mD to 5 mD).

A "conventional formation" refers to a subterranean hydrocarbon-bearing formation having a higher permeability, such as a permeability of from 25 millidarcy to 40,000 millidarcy.

The formation may include faults, fractures (e.g., naturally occurring fractures, fractures created through hydraulic fracturing, etc.), geobodies, overburdens, underburdens, horizons, salts, salt welds, etc. The formation may be onshore, offshore (e.g., shallow water, deep water, etc.), etc. Furthermore, the formation may include hydrocarbons, such as liquid hydrocarbons (also known as oil or petroleum), gas hydrocarbons, any combination of liquid hydrocarbons and gas hydrocarbons (e.g. including gas condensate), etc.

The formation, the hydrocarbons, or both may also include non-hydrocarbon items, such as pore space, connate water, brine, fluids from enhanced oil recovery, etc. The formation may also be divided up into one or more hydrocarbon zones, and hydrocarbons can be produced from each desired hydrocarbon zone.

The term formation may be used synonymously with the term reservoir. For example, in some embodiments, the reservoir may be, but is not limited to, a shale reservoir, a carbonate reservoir, a tight sandstone reservoir, a tight siltstone reservoir, a gas hydrate reservoir, a coalbed methane reservoir, etc. Indeed, the terms "formation," "reservoir," "hydrocarbon," and the like are not limited to any description or configuration described herein.

"Wellbore" refers to a continuous hole for use in hydrocarbon recovery, including any openhole or uncased portion of the wellbore. For example, a wellbore may be a cylindrical hole drilled into the formation such that the wellbore is surrounded by the formation, including rocks, sands, sediments, etc. A wellbore may be used for injection. A wellbore may be used for production. A wellbore may be used for hydraulic fracturing of the formation. A wellbore even may be used for multiple purposes, such as injection and production. The wellbore may have vertical, inclined, horizontal, or any combination of trajectories. For example, the wellbore may be a vertical wellbore, a horizontal wellbore, a multilateral wellbore, or slanted wellbore. The wellbore may include a "build section." "Build section" refers to practically any section of a wellbore where the deviation is changing. As an example, the deviation is changing when the wellbore is curving. The wellbore may include a plurality of components, such as, but not limited to, a casing, a liner, a tubing string, a heating element, a sensor, a packer, a screen, a gravel pack, etc. The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. The wellbore may also include at least one artificial lift device, such as, but not limited to, an electrical submersible pump (ESP) or gas lift. Some non-limiting examples of wellbores may be found in U.S. Patent Application Publication No. 2014/0288909 and U.S. Patent Application Publication No. 2016/0281494A1, each of which is incorporated by reference in its entirety. The term wellbore is not limited to any description or configuration described herein. The term wellbore may be used synonymously with the terms borehole or well.

The term "enhanced oil recovery" refers to techniques for increasing the amount of unrefined petroleum (e.g., crude oil) that may be extracted from an oil reservoir (e.g., an oil field). Using EOR, 40-60% of the reservoir's original oil can typically be extracted compared with only 20-40% using primary and secondary recovery (e.g., by water injection or natural gas injection). Enhanced oil recovery may also be referred to as improved oil recovery or tertiary oil recovery (as opposed to primary and secondary oil recovery). Examples of EOR operations include, for example, miscible gas injection (which includes, for example, carbon dioxide flooding), chemical injection (sometimes referred to as chemical enhanced oil recovery (CEOR), and which includes, for example, polymer flooding, alkaline flooding, surfactant flooding, conformance control operations, as well as combinations thereof such as alkaline-polymer flooding or alkaline-surfactant-polymer flooding), microbial injection, and thermal recovery (which includes, for example, cyclic steam, steam flooding, and fire flooding). In some embodiments, the EOR operation can include a polymer (P) flooding operation, an alkaline-polymer (AP) flooding operation, a surfactant-polymer (SP) flooding operation, an alkaline-surfactant-polymer (ASP) flooding operation, a conformance control operation, or any combination thereof. The terms "operation" and "application" may be used interchangeability herein, as in EOR operations or EOR applications.

"Fracturing" is one way that hydrocarbons may be recovered (sometimes referred to as produced) from the formation. For example, hydraulic fracturing may entail preparing a fracturing fluid and injecting that fracturing fluid into the wellbore at a sufficient rate and pressure to open existing fractures and/or create fractures in the formation. The fractures permit hydrocarbons to flow more freely into the wellbore. In the hydraulic fracturing process, the fracturing fluid may be prepared on-site to include at least proppants. The proppants, such as sand or other particles, are meant to hold the fractures open so that hydrocarbons can more easily flow to the wellbore. The fracturing fluid and the proppants may be blended together using at least one blender. The fracturing fluid may also include other components in addition to the proppants.

The wellbore and the formation proximate to the wellbore are in fluid communication (e.g., via perforations), and the fracturing fluid with the proppants is injected into the wellbore through a wellhead of the wellbore using at least one pump (oftentimes called a fracturing pump). The fracturing fluid with the proppants is injected at a sufficient rate and pressure to open existing fractures and/or create fractures in the subsurface volume of interest. As fractures become sufficiently wide to allow proppants to flow into those fractures, proppants in the fracturing fluid are deposited in those fractures during injection of the fracturing fluid. After the hydraulic fracturing process is completed, the fracturing fluid is removed by flowing or pumping it back out of the wellbore so that the fracturing fluid does not block the flow of hydrocarbons to the wellbore. The hydrocarbons will typically enter the same wellbore from the formation and go up to the surface for further processing.

The equipment to be used in preparing and injecting the fracturing fluid may be dependent on the components of the fracturing fluid, the proppants, the wellbore, the formation, etc. However, for simplicity, the term "fracturing apparatus" is meant to represent any tank(s), mixer(s), blender(s), pump(s), manifold(s), line(s), valve(s), fluid(s), fracturing fluid component(s), proppants, and other equipment and non-equipment items related to preparing the fracturing fluid and injecting the fracturing fluid.

Other hydrocarbon recovery processes may also be utilized to recover the hydrocarbons. Furthermore, those of ordinary skill in the art will appreciate that one hydrocarbon recovery process may also be used in combination with at least one other recovery process or subsequent to at least one other recovery process. Moreover, hydrocarbon recovery processes may also include stimulation or other treatments.

"Fracturing fluid," as used herein, refers to an injection fluid that is injected into the well under pressure in order to cause fracturing within a portion of the reservoir.

The term "interfacial tension" or "IFT" as used herein refers to the surface tension between test oil and water of different salinities containing a surfactant formulation at different concentrations. Typically, interfacial tensions are measured using a spinning drop tensiometer or calculated from phase behavior experiments.

The term "contacting" as used herein, refers to materials or compounds being sufficiently close in proximity to react or interact. For example, in methods of contacting a foam, an emulsion or any combination thereof with a breaking composition, the method can include combining the foam, the emulsion or any combination thereof with the breaking composition any suitable manner known in the art (e.g., pumping, injecting, pouring, releasing, displacing, spotting or circulating the breaking composition into a vessel, pipeline, holding tank, separator, pipe, wellbore, or formation containing the foam, the emulsion, or any combination thereof).

The terms "unrefined petroleum" and "crude oil" are used interchangeably and in keeping with the plain ordinary usage of those terms. "Unrefined petroleum" and "crude oil" may be found in a variety of petroleum reservoirs (also referred to herein as a "reservoir," "oil field deposit" "deposit" and the like) and in a variety of forms including oleaginous materials, oil shales (i.e., organic-rich fine-grained sedimentary rock), tar sands, light oil deposits, heavy oil deposits, and the like. "Crude oils" or "unrefined petroleums" generally refer to a mixture of naturally occurring hydrocarbons that may be refined into diesel, gasoline, heating oil, jet fuel, kerosene, and other products called fuels or petrochemicals. Crude oils or unrefined petroleums are named according to their contents and origins, and are classified according to their per unit weight (specific gravity). Heavier crudes generally yield more heat upon burning, but have lower gravity as defined by the American Petroleum Institute (API) (i.e., API gravity) and market price in comparison to light (or sweet) crude oils. Crude oil may also be characterized by its Equivalent Alkane Carbon Number (EACN). The term "API gravity" refers to the measure of how heavy or light a petroleum liquid is compared to water. If an oil's API gravity is greater than 10, it is lighter and floats on water, whereas if it is less than 10, it is heavier and sinks. API gravity is thus an inverse measure of the relative density of a petroleum liquid and the density of water. API gravity may also be used to compare the relative densities of petroleum liquids. For example, if one petroleum liquid floats on another and is therefore less dense, it has a greater API gravity.

Crude oils vary widely in appearance and viscosity from field to field. They range in color, odor, and in the properties they contain. While all crude oils are mostly hydrocarbons, the differences in properties, especially the variation in molecular structure, determine whether a crude oil is more or less easy to produce, pipeline, and refine. The variations may even influence its suitability for certain products and the quality of those products. Crude oils are roughly classified into three groups, according to the nature of the hydrocarbons they contain. (i) Paraffin-based crude oils contain higher molecular weight paraffins, which are solid at room temperature, but little or no asphaltic (bituminous) matter. They can produce high-grade lubricating oils. (ii) Asphaltene based crude oils contain large proportions of asphaltic matter, and little or no paraffin. Some are predominantly naphthenes and so yield lubricating oils that are sensitive to temperature changes than the paraffin-based crudes. (iii) Mixed based crude oils contain both paraffin and naphthenes, as well as aromatic hydrocarbons. Most crude oils fit this latter category.

"Reactive" crude oil, as referred to herein, is crude oil containing natural organic acidic components (also referred to herein as unrefined petroleum acid) or their precursors such as esters or lactones. These reactive crude oils can generate soaps (carboxylates) when reacted with alkali. More terms used interchangeably for crude oil throughout this disclosure are hydrocarbons, hydrocarbon material, or active petroleum material. An "oil bank" or "oil cut" as referred to herein, is the crude oil that does not contain the injected chemicals and is pushed by the injected fluid during an enhanced oil recovery process. A "nonactive oil," as used herein, refers to an oil that is not substantially reactive or crude oil not containing significant amounts of natural organic acidic components or their precursors such as esters or lactones such that significant amounts of soaps are generated when reacted with alkali. A nonactive oil as referred to herein includes oils having an acid number of less than 0.5 mg KOH/g of oil.

"Unrefined petroleum acids" as referred to herein are carboxylic acids contained in active petroleum material (reactive crude oil). The unrefined petroleum acids contain $C_{11}$-$C_{20}$ alkyl chains, including napthenic acid mixtures. The recovery of such "reactive" oils may be performed using alkali (e.g., NaOH or $Na_2CO_3$) in a surfactant composition. The alkali reacts with the acid in the reactive oil to form soap in situ. These in situ generated soaps serve as a source of surfactants minimizing the levels of added surfactants, thus enabling efficient oil recovery from the reservoir.

The term "polymer" refers to a molecule having a structure that essentially includes the multiple repetitions of units derived, actually or conceptually, from molecules of low relative molecular mass. In some embodiments, the polymer is an oligomer.

The term "solubility" or "solubilization" in general refers to the property of a solute, which can be a solid, liquid or gas, to dissolve in a solid, liquid or gaseous solvent thereby forming a homogenous solution of the solute in the solvent. Solubility occurs under dynamic equilibrium, which means that solubility results from the simultaneous and opposing processes of dissolution and phase joining (e.g., precipitation of solids). The solubility equilibrium occurs when the two processes proceed at a constant rate. The solubility of a given solute in a given solvent typically depends on temperature. For many solids dissolved in liquid water, the solubility increases with temperature. In liquid water at high temperatures, the solubility of ionic solutes tends to decrease due to the change of properties and structure of liquid water. In more particular, solubility and solubilization as referred to herein is the property of oil to dissolve in water and vice versa.

"Viscosity" refers to a fluid's internal resistance to flow or being deformed by shear or tensile stress. In other words, viscosity may be defined as thickness or internal friction of a liquid. Thus, water is "thin", having a lower viscosity, while oil is "thick", having a higher viscosity. More generally, the less viscous a fluid is, the greater its ease of fluidity.

The term "salinity" as used herein, refers to concentration of salt dissolved in an aqueous phases. Examples for such salts are without limitation, sodium chloride, magnesium and calcium sulfates, and bicarbonates. In more particular, the term salinity as it pertains to the present invention refers to the concentration of salts in brine and surfactant solutions.

The term "co-solvent," as used herein, refers to a compound having the ability to increase the solubility of a solute (e.g., a surfactant as disclosed herein) in the presence of an unrefined petroleum acid. In some embodiments, the co-solvents provided herein have a hydrophobic portion (alkyl or aryl chain), a hydrophilic portion (e.g., an alcohol) and optionally an alkoxy portion. Co-solvents as provided herein include alcohols (e.g., $C_1$-$C_6$ alcohols, $C_1$-$C_6$ diols), alkoxy alcohols (e.g., $C_1$-$C_6$ alkoxy alcohols, $C_1$-$C_6$ alkoxy diols, and phenyl alkoxy alcohols), glycol ether, glycol and glycerol. The term "alcohol" is used according to its ordinary meaning and refers to an organic compound containing an —OH groups attached to a carbon atom. The term "diol" is used according to its ordinary meaning and refers to an organic compound containing two —OH groups attached to two different carbon atoms. The term "alkoxy alcohol" is used according to its ordinary meaning and refers to an organic compound containing an alkoxy linker attached to a —OH group The phrase "surfactant package," as used herein, refers to one or more surfactants which are present in a composition.

The term "alkyl," as used herein, refers to saturated straight, branched, cyclic, primary, secondary or tertiary hydrocarbons, including those having 1 to 32 atoms. In some embodiments, alkyl groups will include $C_1$-$C_{32}$, $C_7$-$C_{32}$, $C_7$-$C_{28}$, $C_{12}$-$C_{28}$, $C_{12}$-$C_{22}$, $C_1$-$C_{12}$, $C_1$-$C_{10}$, $C_1$-$C_8$, $C_1$-$C_6$, $C_1$-$C_5$, $C_1$-$C_4$, $C_1$-$C_3$, $C_1$-$C_2$, or $C_1$ alkyl groups. Examples of $C_1$-$C_{10}$ alkyl groups include, but are not limited to, methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl and decyl groups, as well as their isomers. Examples of $C_1$-$C_4$-alkyl groups include, for example, methyl, ethyl, propyl, 1-methylethyl, butyl, 1-methylpropyl, 2-methylpropyl and 1,1-dimethylethyl groups.

Cyclic alkyl groups or "cycloalkyl" groups, as used herein, include cycloalkyl groups having from 3 to 10 carbon atoms. Cycloalkyl groups can include a single ring, or multiple condensed rings. In some embodiments, cycloalkyl groups include $C_3$-$C_4$, $C_4$-$C_7$, $C_5$-$C_7$, $C_4$-$C_6$, or $C_5$-$C_6$ cyclic alkyl groups. Non-limiting examples of cycloalkyl groups include adamantyl, cyclopropyl, cyclobutyl, cyclopentyl, cyclohexyl, cycloheptyl, cyclooctyl and the like.

Alkyl groups can be unsubstituted or substituted with one or more moieties selected from the group consisting of alkyl, alkenyl, halo, haloalkyl, hydroxyl, carboxyl, acyl, acyloxy, amino, alkyl- or dialkylamino, amido, arylamino, alkoxy, aryloxy, nitro, cyano, ester, aryl, or any other viable functional group that is permitted by valence and does not compromise stability.

Terms including the term "alkyl," such as "alkylcycloalkyl," "cycloalkylalkyl," "alkylaryl," or "arylalkyl," will be understood to comprise an alkyl group as defined above linked to another functional group, where the group is linked to the compound through the last group listed, as understood by those of skill in the art.

The term "alkenyl," as used herein, refers to both straight and branched carbon chains which have at least one carbon-carbon double bond. In some embodiments, alkenyl groups can include $C_2$-$C_{32}$ alkenyl groups. In other embodiments, alkenyl can include $C_7$-$C_{32}$, $C_7$-$C_{28}$, $C_8$-$C_{28}$, $C_{12}$-$C_{28}$, or $C_{12}$-$C_{22}$ alkenyl groups. In one embodiment of alkenyl, the number of double bonds is 1-3, in another embodiment of alkenyl, the number of double bonds is one or two. Other ranges of carbon-carbon double bonds and carbon numbers are also contemplated depending on the location of the alkenyl moiety on the molecule. "$C_2$-$C_{10}$-alkenyl" groups may include more than one double bond in the chain. The one or more unsaturations within the alkenyl group may be located at any position(s) within the carbon chain as valence permits. In some embodiments, when the alkenyl group is covalently bound to one or more additional moieties, the carbon atom(s) in the alkenyl group that are covalently bound to the one or more additional moieties are not part of a carbon-carbon double bond within the alkenyl group. Examples of alkenyl groups include, but are not limited to, ethenyl, 1-propenyl, 2-propenyl, 1-methyl-ethenyl, 1-butenyl, 2-butenyl, 3-butenyl, 1-methyl-1-propenyl, 2-methyl-1-propenyl, 1-methyl-2-propenyl, 2-methyl-2-propenyl; 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl and 1-ethyl-2-methyl-2-propenyl groups.

The term "aryl," as used herein, refers to a monovalent aromatic carbocyclic group of from 6 to 14 carbon atoms. Aryl groups can include a single ring or multiple condensed rings. In some embodiments, aryl groups include C6-C10 aryl groups. Aryl groups include, but are not limited to, phenyl, biphenyl, naphthyl, tetrahydronaphtyl, phenylcyclopropyl and indanyl. Aryl groups may be unsubstituted or substituted by one or more moieties selected from alkyl, alkenyl, halo, haloalkyl, hydroxyl, carboxyl, acyl, acyloxy, amino, alkyl- or dialkylamino, amido, arylamino, alkoxy, aryloxy, nitro, cyano, ester, aryl, or any other viable functional group that is permitted by valence and does not compromise stability.

The term "alkylaryl," as used herein, refers to an aryl group that is bonded to a parent compound through a diradical alkylene bridge, $(-CH_2-)_n$, where n is 1-12 and where "aryl" is as defined above.

The term "alkylcycloalkyl," as used herein, refers to a cycloalkyl group that is bonded to a parent compound through a diradical alkylene bridge, $(-CH_2-)_n$, where n is 1-12 and where "cycloalkyl" is as defined above. The term "cycloalkylalkyl," as used herein, refers to a cycloalkyl group, as defined above, which is substituted by an alkyl group, as defined above.

Methods

Described herein are methods for breaking a foam, emulsion, or any combination thereof. The methods can comprise contacting the foam, emulsion, or any combination thereof with a breaking composition. The breaking composition can comprise a partitioning agent and optionally one or more defoamers, demulsifiers, or any combination thereof.

In some embodiments, the foam, emulsion, or any combination thereof can be formed during an oil and gas operation. In certain embodiments, the foam, emulsion or any combination thereof can comprise produced fluid (as discussed in more detail below) produced during an oil and gas operation. In certain embodiments, the produced fluid can comprise both a foam and an emulsion.

The emulsion can comprise a microemulsion. In some embodiments, the emulsion can comprise a Winsor Type I microemulsion. In a Winsor Type I emulsion, a surfactant forms an oil-in-water microemulsion in the aqueous phase. In some embodiments, the emulsion can comprise a Winsor Type II microemulsion. In a Winsor Type II system, a surfactant forms a water-in-oil emulsion in the oil phase. In some embodiments, the emulsion can comprise a Winsor Type III microemulsion. In a Winsor Type III system, a surfactant forms a microemulsion in a separate phase between the oil and aqueous phases. This phase can be, for example, a continuous layer containing surfactant, water and dissolved hydrocarbons.

In some embodiments, the foam, emulsion, or any combination thereof can be present within equipment associated with an oil and gas operation. For example, the foam, emulsion, or any combination thereof can be present within a vessel, pipeline, holding tank, separator, pipe, wellbore, wellhead, or any combination thereof. In these embodiments, contacting the foam, the emulsion, or any combination thereof with the breaking composition can comprise pumping, injecting, pouring, releasing, displacing, spotting or circulating the breaking composition into the vessel, the pipeline, the holding tank, the separator, the pipe, the wellbore, the wellhead, or any combination thereof.

In certain embodiments, the foam, emulsion, or any combination can be present in a pipe, a pipeline, wellhead, wellbore, or any combination thereof. In some of these embodiments, the methods for breaking the foam, the emulsion, or any combination thereof can comprise injecting the breaking composition into the pipe, the pipeline, the wellhead, the wellbore, or any combination thereof. The breaking composition can be injected into the pipe, the pipeline, the wellhead, the wellbore, or any combination thereof continuously. In other embodiments, the breaking composition can be injected into the pipe, the pipeline, the wellhead, the wellbore, or any combination thereof in one or more discrete injections.

In certain embodiments, the foam, emulsion, or any combination can be present in a holding tank, a separator, or any combination thereof. In some of these embodiments, the methods for breaking the foam, the emulsion, or any combination thereof can comprise injecting the breaking composition into the holding tank, the separator, or any combination thereof. In some of these embodiments, the methods for breaking the foam, the emulsion, or any combination thereof can comprise injecting the breaking composition upstream of the holding tank, upstream of the separator, or any combination thereof. In some of these embodiments, the methods for breaking the foam, the emulsion, or any combination thereof can comprise injecting the breaking composition downstream of the holding tank, downstream of the separator, or any combination thereof. The breaking composition can be injected continuously. In other embodiments, the breaking composition can be injected in one or more discrete injections.

In some embodiments, the breaker composition is combined with the foam, the emulsion, or any combination thereof at varying concentrations. In some embodiments, the breaker composition is combined with the foam, the emulsion, or any combination thereof at a concentration of 0.01% by volume or more (e.g., 0.05% by volume or more, 0.1% by volume or more, 0.5% by volume or more, 1% by volume or more, 2% by volume or more, 3% by volume or more, or 4% by volume or more). In some embodiments, breaker composition is combined with the foam, the emulsion, or any combination thereof at a concentration of 5% by volume or less (e.g., 4% by volume or less, 3% by volume or less, 2% by volume or less, 1% by volume or less, 0.5% by volume or less, 0.1% by volume or less, or 0.05% by volume).

In some embodiments, the breaker composition is combined with the foam, the emulsion, or any combination thereof at a concentration that can range from any of the minimum values described above to any of the maximum values described above. For example, the breaker composition is combined with the foam, the emulsion, or any combination thereof at a concentration from 0.01% to 5% by volume (e.g., from 0.01% to 2% by volume, from 0.01% to 1% by volume, from 0.01% to 0.5% by volume, from 0.05% to 5% by volume, from 0.05% to 2% by volume, from 0.05% to 1% by volume, from 0.05% to 0.5% by volume, from 0.1% to 5% by volume, from 0.1% to 2% by volume, from 0.1% to 1% by volume, or from 0.1% to 0.5% by volume.

Also provided are methods for hydrocarbon recovery that comprise producing fluids from a conventional or unconventional formation through a wellbore, wherein the produced fluids comprise a foam, an emulsion, or any combination thereof; contacting the produced fluids comprising the foam, the emulsion, or any combination thereof with a breaking composition described herein; and separating a hydrocarbon phase from the foam, the emulsion, or any combination thereof. In some embodiments, the method can further comprise preparing the breaking composition, and injecting the breaking composition.

In some embodiments, the breaking composition can be injected into a vessel, a pipeline, a holding tank, a separator, a pipe, a wellbore, a wellhead, or any combination thereof. Breaking can occur within the vessel, the pipeline, the holding tank, the separator, the pipe, the wellbore, the wellhead, or any combination thereof.

Figure 30:
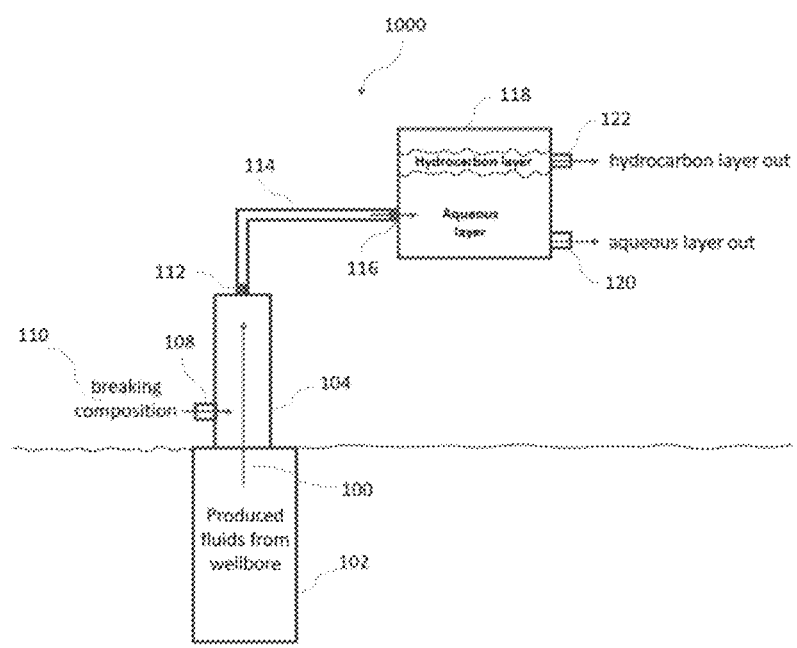
FIG. 30 is an illustration of an example method and system for of using the breaking compositions described herein for the production of hydrocarbons.

By way of example, FIG. 30 illustrates an example method and system (1000) for hydrocarbon recovery. As shown in FIG. 30, produced fluids (100) comprising an emulsion, a foam, or any combination thereof are produced from a wellbore (102). The produced fluids can be contacted with a breaking composition (110) by injecting the breaking composition into the stream of produced fluids (100) within the wellhead (104). A breaking composition inlet valve (108) can be used to control injection of the breaking composition. An outlet valve (112) can control flow of the produced fluid stream (along with the breaking composition) from the wellhead (104) into a conduit or pipe (114). The conduit or pipe (114) can carry the composition downstream to a settling tank (118), where the produced fluids separate to form an aqueous phase and a hydrocarbon phase. An inlet valve (116) can control flow of the produced fluids into the settling tank (118). The hydrocarbon phase can then be collected through a hydrocarbon outlet (122), and the aqueous layer can be collected through an aqueous outlet (120).

The breaking composition can be allowed to contact the produced fluid for varying periods of time depending on the produced fluid. In some embodiments, the breaking composition can be allowed to mix with the produced fluid for 1 second or more, (e.g., 30 seconds or more, 1 minute or more, 5 minutes or more, 10 minutes or more, 15 minutes or more, 30 minutes or more, or 45 minutes or more). In some embodiments, the breaking composition can be allowed to mix with the produced fluid for 60 minutes or less, (e.g., 45 minutes or less, 30 minutes or less, 15 minutes or less, 10 minutes or less, 5 minutes or less, 1 minute or less, 30 seconds or less).

In some embodiments, the breaking composition can be allowed to mix with the produced fluid for from any of the minimum values described above to any of the maximum values described above. For example, the breaking composition can be allowed to mix with the produced fluid for from 1 second to 60 minutes, from 30 seconds to 60 minutes, from 1 minute to 60 minutes, from 5 minutes to 60 minutes, from 10 minutes to 60 minutes, from 15 minutes to 60 minutes, from 30 minutes to 60 minutes, from 45 minutes to 60 minutes, from 1 minute to 30 minutes, from 1 minute to 15 minutes, from 1 minute to 5 minutes, from 5 minutes to 30 minutes, or from 10 minutes to 30 minutes.

In some embodiments, the hydrocarbon recovery methods described herein can comprise producing fluid from fractures of an unconventional subterranean formation proximate to and in fluid communication with the wellbore. The fractures can be naturally occurring factures, fractures from a fracturing operation, fractures from a refracturing operation, or any combination thereof. The fracturing operation may include hydraulic fracturing, fracturing using electrodes such as described in U.S. Pat. Nos. 9,890,627, 9,840,898, U.S. Patent Publication No. 2018/0202273, or fracturing with any other available equipment or methodology. The refracturing operation may include hydraulic fracturing, fracturing using electrodes such as described in U.S. Pat. Nos. 9,890,627, 9,840,898, U.S. Patent Publication No. 2018/0202273, or refracturing with any other available equipment or methodology.

Breaking Compositions

Also provided are breaker compositions. The breaking composition can comprise a partitioning agent and optionally one or more defoamers, demulsifiers, or any combination thereof. In some embodiments, the breaking composition can further include one or more additional components, such as a diluent, a polymer, a pH adjusting agent, a chelating agent, a corrosion inhibitor, a biocide, or any combination thereof.

Partitioning Agents

In some embodiments, the partitioning agent is a fluid. In these embodiments, the breaking composition can comprise the partitioning agent alone.

In some embodiments, the partitioning agent can have a dielectric constant of from 1 to 50, such as from 1 to 35, from 1 to 30, from 1 to 25, from 1 to 15, from 15 to 35, from 15 to 30, or from 15 to 25.

The octanol-water partition coefficient of a substance X at a given temperature is represented by P and defined by the equation below $$[P] = \frac{[X]^{octanol}}{[X]^{water}}$$

i.e., the ratio of concentrations of the substance (mole/volume) in octanol ($[X]^{octanol}$) and water ($[X]^{water}$) at equilibrium. For purposes of describing the partitioning agents described herein, in some embodiments, the log of the partition coefficient at 25° (log[P]) can be from −1 to 5, such as from −1 to 3, from −1 to 2, from −1 to 1.5, from −1 to 1, from −1 to 0.8, from −1 to 0.7, from 0.01 to 5, from 0.01 to 3, from 0.01 to 2, from 0.01 to 1, from 0.1 to 5, from 0.1 to 3, from 0.1 to 2, from 0.1 to 1, from 0.1 to 0.7, from 0.1 to 0.5, from 0.5 to 5, from 0.5 to 3, from 0.5 to 2, from 1 to 5, from 1 to 3, or from 1 to 2.

The partitioning agent can comprise an alcohol, an ether, a non-ionic surfactant, or any combination thereof.

In some embodiments, the partitioning agent can comprise an alcohol. In some embodiments, the alcohol can comprise at least 2 carbons (e.g., from 2 to 20 carbons, such as from 2 to 12 carbons). In some examples, the alcohol comprises a C2-C10 alcohol, such as a C2-C8 alcohol, a C2-C6 alcohol, a C3-C10 alcohol, a C3-C8 alcohol, a C3-C6 alcohol, a C4-C10 alcohol, a C4-C8 alcohol, a C4-C6 alcohol, a C5-C10 alcohol, a C5-C8 alcohol, or a C5-C7 alcohol, or a C5-C6 alcohol. In some embodiments the alcohol can be branched.

In some cases, the alcohol can comprise a C4-C10 alcohol (branched or unbranched). In some cases, the alcohol can comprise a C4-C8 alcohol (branched or unbranched). In some cases, the alcohol can comprise a C5-C10 alcohol (branched or unbranched). In some cases, the alcohol can comprise a C5-C8 alcohol (branched or unbranched). In some cases, the alcohol can comprise a C5-C6 alcohol (branched or unbranched). In some cases, the alcohol can comprise a C6-C8 alcohol (branched or unbranched).

Examples of suitable alcohols include hexanol (e.g., n-hexanol), isopropanol, 2-ethylhexanol (e.g., 2-ethyl-1-hexanol), 4-methyl-2-pentanol (also known as methylisobutyl carbinol), benzyl alcohol, isobutanol, sec-butanol, isobutanol, tert-butanol, pentaerythritol, ethylene glycol, and any combination thereof.

In certain embodiments, the alcohol can comprise 2-ethyl-1-hexanol, 4-methyl-2-pentanol, sec-butyl alcohol, isopropanol, isobutanol, or any combination thereof.

In some embodiments, the partitioning agent can comprise an ether (e.g., a polyether). For example, in some embodiments, the partitioning can comprise an alkyl alkoxylate, such as an alkyl alkoxylate defined by the formula below $$R^1\text{-Z(BO)-Y(PO)-X(EO)}$$

wherein
- $R^1$ represents a branched or unbranched $C_1$-$C_6$ alkyl group or a phenyl group;
- Z represents an integer from 0 to 35, such as from 0 to 30, from 0 to 25, from 0 to 20, from 0 to 15, from 0 to 10, or from 0 to 5;
- BO represents a butoxy group;
- Y represents an integer from 0 to 35, such as from 0 to 30, from 0 to 25, from 0 to 20, from 0 to 15, from 0 to 10, or from 0 to 5;
- PO represents a propoxy group;
- X represents an integer from 1 to 50, such as from 1 to 40, from 1 to 30, from 1 to 25, from 1 to 20, from 1 to 15, from 1 to 10, from 1 to 5; from 2 to 50, from 2 to 40, from 2 to 30, from 2 to 25, from 2 to 20, from 2 to 15, from 2 to 10, from 2 to 5; and
- EO represents an ethoxy group.

In some embodiments, Z is 0.

In some embodiments, Y is 0. In other embodiments, Y is from 1 to 10 (e.g., from 1 to 5).

In some embodiments, both X and Y are 0 (i.e., the alkyl alkoxylate is an alkyl ethoxylate).

In some embodiments, X is from 1 to 10, such as from 2 to 10, 1 to 5, or from 2 to 5.

In some embodiments, $R^1$ is a branched or unbranched $C_1$-$C_6$ alkyl group, such as a branched or unbranched $C_2$-$C_6$ alkyl group, or a branched or unbranched $C_3$-$C_6$ alkyl group.

In some embodiments, the ether can comprise ethylene glycol butyl ether (EGBE), diethylene glycol monobutyl ether (DGBE), triethylene glycol monobutyl ether (TEGBE), ethylene glycol dibutyl ether (EGDE), a phenol-2EO, phenol-4EO, phenol-1PO-2EO, phenol-2PO-2EO, or any combination thereof.

In some embodiments, the partitioning agent can comprise a non-ionic surfactant.

In some embodiments, the non-ionic surfactant can comprise a surfactant defined by the formula

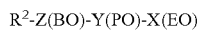

$$R^2\text{-}Z(BO)\text{-}Y(PO)\text{-}X(EO)$$

wherein
- $R^2$ represents a branched or unbranched hydrophobic carbon chain having 7-32 carbon atoms;
- Z represents an integer from 0 to 35, such as from 0 to 30, from 0 to 25, from 0 to 20, from 0 to 15, from 0 to 10, or from 0 to 5;
- BO represents a butoxy group;
- Y represents an integer from 0 to 35, such as from 0 to 30, from 0 to 25, from 0 to 20, from 0 to 15, from 0 to 10, or from 0 to 5;
- PO represents a propoxy group;
- X represents an integer from 1 to 50, such as from 1 to 40, from 1 to 30, from 1 to 25, from 1 to 20, from 1 to 15, from 1 to 10, from 1 to 5; from 2 to 50, from 2 to 40, from 2 to 30, from 2 to 25, from 2 to 20, from 2 to 15, from 2 to 10, from 2 to 5; and
- EO represents an ethoxy group.

In some embodiments, Z is 0.

In some embodiments, Y is 0. In other embodiments, Y is from 1 to 10 (e.g., from 1 to 5).

In some embodiments, both X and Y are 0 (i.e., the non-ionic surfactant comprises an alkyl ethoxylate surfactant).

In some embodiments, X is from 1 to 10, such as from 2 to 10, 1 to 5, or from 2 to 5.

In some embodiments, the branched or unbranched hydrophobic carbon chain having 7-32 carbon atoms can comprise a branched or unbranched $C_7$-$C_{32}$ alkyl group, a branched or unbranched $C_7$-$C_{32}$ alkylaryl group, or a branched or unbranched $C_7$-$C_{32}$ arylalkyl group, or a cycloalkyl group.

Defoamer and Demulsifiers

Optionally, the composition can include one or more defoamers, one or more demulsifiers, or any combinations thereof. Defoamers and demulsifiers are known in the art. Examples of such materials include oil-based defoamers, water-based defoamers, silicone-based defoamers, alkyleneoxy-based defoamers, polyacrylate dofoamers, ketone-based defoamers, phenol-formaldehyde resins (acid-catalyzed phenol-formaldehyde resins, base-catalyzed phenol-formaldehyde resins), epoxy resins, polyamines (including polyamine polymers), polyols, di-epoxides, dendrimers, star polymers, zwitterionic surfactants, cationic surfactants, and combinations thereof.

In some embodiments, the breaker composition can comprise an oil-based defoamer. Oil based defoamers are known in the art, and include an oil carrier. The oil carrier can comprise, for example, mineral oil, vegetable oil, white oil or any other oil that is insoluble in the foaming medium (except silicone oil). Oil-based defoamers can further include a wax to improve defoaming performance. Typical waxes, include, for example, ethylene bis stearamide (EBS), paraffin waxes, ester waxes, and fatty alcohol waxes. These oil-based defoamers can also include surfactants to improve emulsification and spreading in the foaming medium.

In some embodiments, the breaker composition can comprise a water-based defoamer. Water-based defoamers are known in the art, and can include one or more oils, one or more waxes, or any combination thereof dispersed in an aqueous carrier. Examples of suitable oils include mineral oil or vegetable oils. Examples of suitable waxes include long chain fatty alcohols and fatty acid soaps or esters.

In some embodiments, the breaker composition can comprise a silicone-based defoamer. Silicone-based defoamers are known in the art, and can include, for example, a silicone polymer or oligomer (e.g., a polymer or oligomer with a silicon backbone). These might be delivered as an oil or a water-based emulsion. The silicone compound might also comprise a silicone glycol or other modified silicone fluids. In some embodiments, the silicone-based defoamer can a polydimethylsiloxane or derivative thereof. Fluorosilicones can also be used.

In some embodiments, the breaker composition can comprise an alkyleneoxy-based defoamer. Alkyleneoxy-based defoamers are known in the art, and can include polyalkylene oxides (e.g., polyethylene glycol, polypropylene glycol, polybutylene glycol, copolymers thereof, and blends thereof). These defoamers can be formulated in oil-based solutions, aqueous solutions, or water-based emulsions.

In some embodiments, the breaker composition can comprise a polyacrylate. Polyacrylates (alkyl polyacrylates) are often formulated in an organic solvent carrier (e.g., a petroleum distillate).

In some embodiments, the breaker composition can comprise a wax. The wax can include an oxidized polyethylene wax, a microcrystalline wax, a hydroxyl group-containing wax, a paraffin wax, a natural wax, a maleic acid modified wax, an ethylene-vinyl acetate copolymer wax, an ethylene-acrylic acid copolymer wax, a Fischer-Tropsch wax, a wood wax, beeswax, palm wax, carnauba wax, montan wax, or any combination thereof.

In some embodiments, the breaker composition can comprise a fatty acid diamide. The fatty acid diamide can comprise, for example, ethylene bisstearylamide, ethylene bispalmitylamide, ethylene bislaurylamide, methylene bisstearylamide, hexamethylene bisstearylamide, or a combination thereof.

In some embodiments, the breaker composition can comprise a metal soap. Metal soaps can comprise salts of fatty acids having 12 to 22 carbon atoms and metals (alkaline earth metals, aluminum, manganese, cobalt, copper, iron, zinc, nickel, etc.). Examples of metal soaps include aluminum stearate, manganese stearate, stearin, cobalt stearate, copper stearate, iron stearate, nickel stearate, calcium stearate, zinc laurate, magnesium behenate, and combinations thereof.

In some embodiments, the breaker composition can comprise one or more of the following: (1) polysiloxanes (silicones), such as polydimethylsiloxanes (e.g., $(CH_3)_3SiO[SiO(CH_3)_2]$, $Si(CH_3)_3$), decamethylpentasiloxane, organo-modified silicones, octamethylcyclotetrasiloxane, silicone polyalkyleneoxides, silicone glycols, polydimethylsiloxanes, silicone co-polymers, trimethylsiloxy-terminated polydimethylsiloxanes, trimethylsiloxy-terminated trifluoropropylmethylsiloxane, alkylaryl siloxanes, polyether modified polysiloxanes, etc.; (2) ethoxylates, such as octylphenol ethoxylate, nonylphenol ethoxylate, alcohol ethoxylates, etc.; (3) wax-based compounds, such as N,N'-bisstearoylethylendiamine, synthetic wax/mineral oil blends, sorbitan trioleate, etc.; (4) fluoro-substituted compounds, such as fluorosilicones, fluorinated alcohols, fluoroalkyl alcohol substituted polyethylenes, fluorinated substituted urethanes, perfluoroalkyl methacrylic copolymers, perfluoroalkyl polyurethanes, perfluorobutylethylene, perfluorohexylethyl alcohols, perfluorohexane, perfluorooctane, perfluorohexylethyl methacrylate, polyfluorosulfonic acids, fluoroglycols, fluoroalcohol glycols, perfluoroalkyl methacrylate copolymers, perfluoroalkylsulfonic acid, fluorinated acrylic copolymers, fluoroethoxylates, etc.; (5) polymers, such as polyethers, alkyl copolymers, alkyl polyglucocides, ethylene oxide copolymers, propylene oxide copolymers, polyalkyleneglycols, polyether polyols, phosphate polyether esters, polyethylene glycol copolymers, polypropylene glycol copolymers, polyacrylates, polypropylenes, etc., (6) mineral oils, such as activated white oils, paraffin-based mineral oils, etc.; (7) surfactant-type compounds, such as methacrylated mono- and di-phosphate esters, trialkyl phosphate esters, fatty acids, propoxylated/ethoxylated alcohols, alkoxylated secondary alcohols (e.g., ethoxylated C11-C15 secondary alcohols)etc.; (8) sulphur-based compounds, such as polyether sulfates, alkoxylate sulfates, dioctyl sulfosuccinate, alkyldiphenyloxide disulfonate, etc.; (9) succinates; (10) seed oil based defoamers; (11) long chain chlorinated alkanes, including C20+ chlorinated alkanes; (12) cellulose ethers, such as methyl cellulose; (13) ketones, such as methyl isobutyl ketone; and any combination thereof.

In certain embodiments, the breaker composition can comprise an oligo- and/or polysiloxane (silicone), such as a polydimethylsiloxane (e.g., $(CH_3)_3SiO[SiO(CH_3)_2]_nSi(CH_3)_3$), decamethylpentasiloxane, an organo-modified silicone, octamethylcyclotetrasiloxane, a silicone polyalkyleneoxide, a silicone glycol, a silicone co-polymer, a fluorosiloxane (e.g., trifluoropropylmethylsiloxane), a trimethylsiloxy-terminated polydimethylsiloxane, a trimethylsiloxy-terminated trifluoropropylmethylsiloxane, a alkylaryl siloxane, a polyether-modified polysiloxane, or any combination thereof. In one example, the breaker composition can comprise octamethylcyclotetrasiloxane. In one example, the breaker composition can comprise a polydimethylsiloxane.

In certain embodiments, the breaker composition can comprise a ketone, such as methyl isobutyl ketone.

In certain embodiments, the breaker composition can comprise a cellulose ether, such as methyl cellulose.

In certain embodiments, the breaker composition can comprise a propoxylated/ethoxylated alcohol.

Additional Components

Optionally, the breaking composition can include one or more additional components. Examples of suitable additional components include, but are not limited to, a diluent, a polymer, a pH adjusting agent, a chelating agent (e.g., EDTA or a salt thereof), a corrosion inhibitor, a biocide, or any combination thereof.

In certain embodiments, the breaking composition can comprise a diluent, such as water, methanol, hydrocarbon solvent (light aromatic naptha, xylene, heptane, octane, etc.), or any combination thereof.

Produced Fluid

In some embodiments, the foam, emulsion, or any combination thereof can comprise produced fluid (fluid produced from a hydrocarbon-bearing formation). The produced fluid can comprise an aqueous component (water, brine, etc.), a hydrocarbon component (e.g., crude oil), and one or more surfactants.

In some embodiments, the produced fluid can comprise fluid produced following injection of an aqueous composition into a formation. The aqueous composition can comprise, for example, an injection fluid introduced into the formation as part of an enhanced oil recovery (EOR) operation. Examples of EOR operations include, for example, chemical injection (sometimes referred to as chemical enhanced oil recovery (CEOR), and which includes, for example, polymer flooding, alkaline flooding, surfactant flooding, conformance control operations, as well as combinations thereof such as alkaline-polymer flooding or alkaline-surfactant-polymer flooding), a stimulation operation (e.g., a surfactant stimulation operation), microbial injection, and thermal recovery (which includes, for example, cyclic steam, steam flooding, and fire flooding). In some embodiments, the EOR operation can include an alkaline (A) flooding operation, a polymer (P) flooding operation, an alkaline-polymer (AP) flooding operation, a surfactant-polymer (SP) flooding operation, an alkaline-surfactant-polymer (ASP) flooding operation, a conformance control operation, a stimulation operation, or any combination thereof. In other examples, the aqueous composition can comprise a fracturing fluid. In other examples, the aqueous composition can comprise a composition injected for wellbore/near-wellbore cleanup operations. In these embodiments, the aqueous component of the produced fluid can include one or more components of the injection fluid.

The aqueous component can comprise, for example, produced reservoir brine, reservoir brine, seawater, fresh water, produced water, water, saltwater (e.g. water containing one or more salts dissolved therein), brine, synthetic brine, synthetic seawater brine, or any combination thereof.

The produced fluid can further include one or more surfactants. The one or more surfactants can comprise one or more surfactants injected into the reservoir as part of an oil recovery application, one or more surfactants produced in situ within the reservoir (e.g., from reaction of an active oil), or a combination thereof.

In some embodiments, the one or more surfactants can comprise a surfactant package (e.g., a surfactant package that was injected into the reservoir as part of an oil and gas operation and then produced (along with an aqueous fluid and hydrocarbons), either from the same well into which the surfactant package was injected or from a nearby production well in fluid communication with the well into the surfactant package was injected.

In some embodiments, the surfactant package can comprise a primary surfactant and optionally one or more secondary surfactants, where at least one of the surfactants. In some embodiments, the primary surfactant can comprise an anionic surfactant, and the optional one or more secondary surfactants can be selected from an anionic surfactant, a cationic surfactant, a zwitterionic surfactant, an amphoteric surfactant, a non-ionic surfactant, or any combination thereof. In some embodiments, the primary surfactant can comprise a non-ionic surfactant, and the optional one or more secondary surfactants can be selected from an anionic surfactant, a cationic surfactant, a zwitterionic surfactant, an amphoteric surfactant, a non-ionic surfactant, or any combination thereof Examples of anionic surfactants that may be present as a primary surfactant and/or a secondary surfactant include a hydrophobic tail that comprises from 6 to 60 carbon atoms. In some embodiments, the anionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the anionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The anionic surfactant can include a hydrophobic tail that comprises a number of carbon atoms ranging from any of the minimum values described above to any of the maximum values described above. For example, in some embodiments, the anionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. The hydrophobic (lipophilic) carbon tail may be a straight chain, branched chain, and/or may comprise cyclic structures. The hydrophobic carbon tail may comprise single bonds, double bonds, triple bonds, or any combination thereof. In some embodiments, the anionic surfactant can include a branched hydrophobic tail derived from Guerbet alcohols. The hydrophilic portion of the anionic surfactant can comprise, for example, one or more sulfate moieties (e.g., one, two, or three sulfate moieties), one or more sulfonate moieties (e.g., one, two, or three sulfonate moieties), one or more sulfosuccinate moieties (e.g., one, two, or three sulfosuccinate moieties), one or more carboxylate moieties (e.g., one, two, or three carboxylate moieties), or any combination thereof.

In some embodiments, the anionic surfactant can comprise, for example a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof. In some examples, the anionic surfactant can comprise an internal olefin sulfonate (IOS) other than the olefin sulfonates described herein, an isomerized olefin sulfonate, an alfa olefin sulfonate (AOS), an alkyl aryl sulfonate (AAS), a xylene sulfonate, an alkane sulfonate, a petroleum sulfonate, an alkyl diphenyl oxide (di)sulfonate, an alcohol sulfate, an alkoxy sulfate, an alkoxy sulfonate, an alkoxy carboxylate, an alcohol phosphate, or an alkoxy phosphate. In some embodiments, the anionic surfactant can comprise an alkoxy carboxylate surfactant, an alkoxy sulfate surfactant, an alkoxy sulfonate surfactant, an alkyl sulfonate surfactant, an aryl sulfonate surfactant, or an olefin sulfonate surfactant.

An "alkoxy carboxylate surfactant" or "alkoxy carboxylate" refers to a compound having an alkyl or aryl attached to one or more alkoxylene groups (typically —CH$_2$—CH(ethyl)-O—, —CH$_2$—CH(methyl)-O—, or —CH$_2$—CH$_2$—O—) which, in turn is attached to —COO$^-$ or acid or salt thereof including metal cations such as sodium. In embodiments, the alkoxy carboxylate surfactant can be defined by the formulae below:

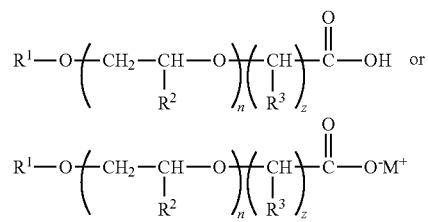

wherein $R^1$ is substituted or unsubstituted C6-C36 alkyl or substituted or unsubstituted aryl; $R^2$ is, independently for each occurrence within the compound, hydrogen or unsubstituted C1-C6 alkyl; $R^3$ is independently hydrogen or unsubstituted C1-C6 alkyl, n is an integer from 0 to 175, z is an integer from 1 to 6 and $M^+$ is a monovalent, divalent or trivalent cation. In some of these embodiments, $R^1$ can be an unsubstituted linear or branched C6-C36 alkyl.

In certain embodiments, the alkoxy carboxylate can be a C6-C32:PO(0-65):EO(0-100)-carboxylate (i.e., a C6-C32 hydrophobic tail, such as a branched or unbranched C6-C32 alkyl group, attached to from 0 to 65 propyleneoxy groups (—$CH_2$—CH(methyl)-O— linkers), attached in turn to from 0 to 100 ethyleneoxy groups (—$CH_2$—$CH_2$—O— linkers), attached in turn to —$COO^-$ or an acid or salt thereof including metal cations such as sodium). In certain embodiments, the alkoxy carboxylate can be a branched or unbranched C6-C30:PO(30-40):EO(25-35)-carboxylate. In certain embodiments, the alkoxy carboxylate can be a branched or unbranched C6-C12:PO(30-40):EO(25-35)-carboxylate. In certain embodiments, the alkoxy carboxylate can be a branched or unbranched C6-C30:EO(8-30)-carboxylate.

An "alkoxy sulfate surfactant" or "alkoxy sulfate" refers to a surfactant having an alkyl or aryl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium. In some embodiment, the alkoxy sulfate surfactant has the formula R-$(BO)_e$-$(PO)_f$-$(EO)_g$-$SO_3^-$ or acid or salt (including metal cations such as sodium) thereof, wherein R is C6-C32 alkyl, BO is —$CH_2$—CH(ethyl)-O—, PO is —$CH_2$—CH(methyl)-O—, and EO is —$CH_2$—$CH_2$—O—. The symbols e, f and g are integers from 0 to 50 wherein at least one is not zero.

In embodiments, the alkoxy sulfate surfactant can be an aryl alkoxy sulfate surfactant. The aryl alkoxy surfactant can be an alkoxy surfactant having an aryl attached to one or more alkoxylene groups (typically —$CH_2$—CH(ethyl)-O—, —$CH_2$—CH(methyl)-O—, or —$CH_2$—$CH_2$—O—) which, in turn is attached to —$SO_3^-$ or acid or salt thereof including metal cations such as sodium.

An "alkyl sulfonate surfactant" or "alkyl sulfonate" refers to a compound that includes an alkyl group (e.g., a branched or unbranched C6-C32 alkyl group) attached to —$SO_3^-$ or acid or salt thereof including metal cations such as sodium.

An "aryl sulfate surfactant" or "aryl sulfate" refers to a compound having an aryl group attached to —O—$SO_3^-$ or acid or salt thereof including metal cations such as sodium. An "aryl sulfonate surfactant" or "aryl sulfonate" refers to a compound having an aryl group attached to —$SO_3^-$ or acid or salt thereof including metal cations such as sodium. In some cases, the aryl group can be substituted, for example, with an alkyl group (an alkyl aryl sulfonate).

An "internal olefin sulfonate," "isomerized olefin sulfonate," or "IOS" in the context of co-surfactants present in addition to the olefin sulfonates described herein refers to an unsaturated hydrocarbon compound comprising at least one carbon-carbon double bond and at least one $SO_3^-$ group, or a salt thereof. As used herein, a "C20-C28 internal olefin sulfonate," "a C20-C28 isomerized olefin sulfonate," or "C20-C28 IOS" refers to an IOS, or a mixture of IOSs with an average carbon number of 20 to 28, or of 23 to 25. The C20-C28 IOS may comprise at least 80% of IOS with carbon numbers of 20 to 28, at least 90% of IOS with carbon numbers of 20 to 28, or at least 99% of IOS with carbon numbers of 20 to 28. As used herein, a "C15-C18 internal olefin sulfonate," "C15-C18 isomerized olefin sulfonate," or "C15-C18 IOS" refers to an IOS or a mixture of IOSs with an average carbon number of 15 to 18, or of 16 to 17. The C15-C18 IOS may comprise at least 80% of IOS with carbon numbers of 15 to 18, at least 90% of IOS with carbon numbers of 15 to 18, or at least 99% of IOS with carbon numbers of 15 to 18. The internal olefin sulfonates or isomerized olefin sulfonates may be alpha olefin sulfonates, such as an isomerized alpha olefin sulfonate. The internal olefin sulfonates or isomerized olefin sulfonates may also comprise branching. In certain embodiments, C15-18 IOS may be added to surfactant packages described herein when used for LPS injection fluids intended for use in high temperature unconventional subterranean formations, such as formations above 130° F. (approximately 55° C.). The IOS may be at least 20% branching, 30% branching, 40% branching, 50% branching, 60% branching, or 65% branching. In some embodiments, the branching is between 20-98%, 30-90%, 40-80%, or around 65%. Examples of internal olefin sulfonates and the methods to make them are found in U.S. Pat. No. 5,488,148, U.S. Patent Application Publication 2009/0112014, and SPE 129766, all incorporated herein by reference.

In embodiments, the anionic surfactant can be a disulfonate, alkyldiphenyloxide disulfonate, mono alkyldiphenyloxide disulfonate, di alkyldiphenyloxide disulfonate, or a di alkyldiphenyloxide monosulfonate, where the alkyl group can be a C6-C36 linear or branched alkyl group. In embodiments, the anionic surfactant can be an alkylbenzene sulfonate or a dibenzene disufonate. In embodiments, the anionic surfactant can be benzenesulfonic acid, decyl(sulfophenoxy)-disodium salt; linear or branched C6-C36 alkyl:PO(0-65):EO(0-100) sulfate; or linear or branched C6-C36 alkyl:PO(0-65):EO(0-100) carboxylate. In embodiments, the anionic surfactant is an isomerized olefin sulfonate (C6-C30), internal olefin sulfonate (C6-C30) or internal olefin disulfonate (C6-C30). In some embodiments, the anionic surfactant is a Guerbet-PO(0-65)-EO(0-100) sulfate (Guerbet portion can be C6-C36). In some embodiments, the anionic surfactant is a Guerbet-PO(0-65)-EO(0-100) carboxylate (Guerbet portion can be C6-C36). In some embodiments, the anionic surfactant is alkyl PO(0-65) and EO(0-100) sulfonate: where the alkyl group is linear or branched C6-C36. In some embodiments, the anionic surfactant is a sulfosuccinate, such as a dialkylsulfosuccinate. In some embodiments, thebnionic surfactant is an alkyl aryl sulfonate (AAS) (e.g. an alkyl benzene sulfonate (ABS)), a C10-C30 internal olefin sulfate (IOS), a petroleum sulfonate, or an alkyl diphenyl oxide (di)sulfonate.

In some examples, the anionic surfactant can comprise a surfactant defined by the formula below:

wherein $R^1$ comprises a branched or unbranched, saturated or unsaturated, cyclic or non-cyclic, hydrophobic carbon chain having 6-32 carbon atoms and an oxygen atom linking $R^1$ and $R^2$; $R^2$ comprises an alkoxylated chain comprising at least one oxide group selected from the group consisting of ethylene oxide, propylene oxide, butylene oxide, and combinations thereof; and $R^3$ comprises a branched or unbranched hydrocarbon chain comprising 2-12 carbon atoms and from 2 to 5 carboxylate groups.

In some examples, the anionic surfactant can comprise a surfactant defined by the formula below:

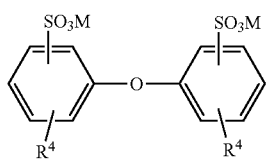

wherein $R^4$ is, independently for each occurrence, a branched or unbranched, saturated or unsaturated, cyclic or non-cyclic, hydrophobic carbon chain having 6-32 carbon atoms; and M represents a counterion (e.g., $Na^+$, $K^+$). In some embodiments, $R^4$ is a branched or unbranched, saturated or unsaturated, cyclic or non-cyclic, hydrophobic carbon chain having 6-16 carbon atoms.

In some embodiments, non-ionic surfactants may be present as the primary surfactant and/or secondary surfactant. Example non-ionic surfactants include compounds that can be added to increase wettability. In some embodiments, the hydrophilic-lipophilic balance (HLB) of the non-ionic surfactant is greater than 10 (e.g., greater than 9, greater than 8, or greater than 7). In some embodiments, the HLB of the non-ionic surfactant is from 7 to 10.

The non-ionic surfactant can comprise a hydrophobic tail comprising from 6 to 60 carbon atoms. In some embodiments, the non-ionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the non-ionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The non-ionic surfactant can include a hydrophobic tail that comprises a number of carbon atoms ranging from any of the minimum values described above to any of the maximum values described above. For example, the non-ionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. In some cases, the hydrophobic tail may be a straight chain, branched chain, and/or may comprise cyclic structures. The hydrophobic carbon tail may comprise single bonds, double bonds, triple bonds, or any combination thereof. In some cases, the hydrophobic tail can comprise an alkyl group, with or without an aromatic ring (e.g., a phenyl ring) attached to it. In some embodiments, the hydrophobic tail can comprise a branched hydrophobic tail derived from Guerbet alcohols.

Example non-ionic surfactants include alkyl aryl alkoxy alcohols, alkyl alkoxy alcohols, or any combination thereof. In embodiments, the non-ionic surfactant may be a mix of surfactants with different length lipophilic tail chain lengths. For example, the non-ionic surfactant may be C9-C11:9EO, which indicates a mixture of non-ionic surfactants that have a lipophilic tail length of 9 carbon to 11 carbon, which is followed by a chain of 9 EOs. The hydrophilic moiety is an alkyleneoxy chain (e.g., an ethoxy (EO), butoxy (BO) and/or propoxy (PO) chain with two or more repeating units of EO, BO, and/or PO). In some embodiments, 1-100 repeating units of EO are present. In some embodiments, 0-65 repeating units of PO are present. In some embodiments, 0-25 repeating units of BO are present. For example, the non-ionic surfactant could comprise 10EO:5PO or 5EO. In embodiments, the non-ionic surfactant may be a mix of surfactants with different length lipophilic tail chain lengths. For example, the non-ionic surfactant may be C9-C11:PO9:EO2, which indicates a mixture of non-ionic surfactants that have a lipophilic tail length of 9 carbon to 11 carbon, which is followed by a chain of 9 POs and 2 EOs. In specific embodiments, the non-ionic surfactant is linear C9-C11:9EO. In some embodiments, the non-ionic surfactant is a Guerbet PO(0-65) and EO(0-100) (Guerbet can be C6-C36); or alkyl PO(0-65) and EO(0-100): where the alkyl group is linear or branched C1-C36. In some examples, the non-ionic surfactant can comprise a branched or unbranched C6-C32:PO(0-65):EO(0-100) (e.g., a branched or unbranched C6-C30:PO(30-40):EO(25-35), a branched or unbranched C6-C12:PO(30-40):EO(25-35), a branched or unbranched $C_6$-30:EO(8-30), or any combination thereof),In some embodiments, the non-ionic surfactant is one or more alkyl polyglucosides.

Example cationic surfactants include surfactant analogous to those described above, except bearing primary, secondary, or tertiary amines, or quaternary ammonium cations, as a hydrophilic head group. "Zwitterionic" or "zwitterion" as used herein refers to a neutral molecule with a positive (or cationic) and a negative (or anionic) electrical charge at different locations within the same molecule. Example zwitterionic surfactants include betains and sultains.

Specific examples of surfactants in that can be present in the produced fluid are shown in the table below.

| Injection Fluid | Surfactants and Co-Surfactants (in weight percent) |
|---|---|
| 1 | 0.1% alkoxylated C6-C18 alcohol<br>0.02% disulfonate |
| 2 | 0.2% alkoxylated C6-C18 alcohol<br>0.06% disulfonate |
| 3 | 0.1% alkoxylated C6-C18 alcohol mixture<br>0.02% disulfonate |
| 4 | 0.1-1% % alkoxylated C6-C18 alcohol |
| 5 | 0.09% % alkoxylated C6-C32 Guerbet alcohol<br>0.03% alkoxylated C6-C16 alcohol<br>0.08% disulfonate |
| 6 | 0.075% alkoxylated C6-C18 alcohol<br>0.075% disulfonate |
| 7 | 0.075% alkoxylated C6-C18 alcohol<br>0.075% betain |
| 8 | 0.08-0.15% alkoxylated C6-C32 Guerbet alcohol<br>0.22-0.15% disulfonate |
| 9 | 0.06-0.14% alkoxylated C6-C32 Guerbet alcohol<br>0.14-0.06% disulfonate |
| 10 | 0.06-0.19% alkoxylated C6-C18 alcohol<br>0.14-0.06% disulfonate |
| 11 | 0.12% alkoxylated C6-C32 Guerbet alcohol<br>0.08% disulfonate |
| 12 | 0.125% alkoxylated C6-C32 Guerbet alcohol<br>0.125% olefin sulfonate<br>0.25% Co-solvent |
| 13 | 0.25% alkoxylated C6-C18 alcohol<br>0.25% olefin sulfonate |
| 14 | 0.25% alkoxylated C6-C32 Guerbet alcohol<br>0.25% olefin sulfonate |
| 15 | 0.1% alkoxylated C6-C18 alcohol sulfate<br>0.2% alkoxylated C6-C18 alcohol mix |
| 16 | 0.12% alkoxylated C6-C18 alcohol<br>0.06% olefin sulfonate<br>0.06% Guerbet alkoxylated sulfate |
| 17 | 0.12% alkoxylated C6-C18 alcohol<br>0.06% olefin sulfonate<br>0.06% alkoxylated C6-C18 sulfate |
| 18 | 0.1% alkoxylated C6-C18 alcohol<br>0.1% disulfonate<br>0.1% alkoxylated C6-C18 sulfate |
| 19 | 0.1% alkoxylated C6-C18 alcohol<br>0.1% olefin sulfonate<br>0.1% alkoxylated C6-C18 sulfate |
| 20 | 0.12% alkoxylated C6-C32 Guerbet alcohol<br>0.06% olefin sulfonate<br>0.06% alkoxylated C6-C18 sulfate |
| 21 | 0.1% alkoxylated C6-C32 Guerbet alcohol<br>0.1% disulfonate<br>0.1% alkoxylated C6-C18 sulfate |
| 22 | 0.1% alkoxylated C6-C32 Guerbet alcohol<br>0.1% olefin sulfonate<br>0.1% alkoxylated C6-C18 alcohol |
| 23 | 0.12% alkoxylated C6-C32 Guerbet alcohol<br>0.06% olefin sulfonate<br>0.06% alkoxylated C6-C18 alcohol |
| 24 | 0.1% alkoxylated C6-C32 Guerbet alcohol<br>0.1% disulfonate<br>0.1% alkoxylated C6-C18 alcohol |
| 25 | 0.1% alkoxylated C6-C32 Guerbet alcohol<br>0.1% olefin sulfonate<br>0.1% alkoxylated C6-C18 sulfate |

Examples of suitable surfactants are disclosed, for example, in U.S. Pat. Nos. 3,811,504, 3,811,505, 3,811,507, 3,890,239, 4,463,806, 6,022,843, 6,225,267, 7,629,299, 7,770,641, 9,976,072, 8,211,837, 9,422,469, 9,605,198, and 9,617,464; WIPO Patent Application Nos. WO/2008/079855, WO/2012/027757 and WO/2011/094442; as well as U.S. Patent Application Publication Nos. 2005/0199395, 2006/0185845, 2006/0189486, 2009/0270281, 2011/0046024, 2011/0100402, 2011/0190175, 2007/0191633, 2010/004843, 2011/0201531, 2011/0190174, 2011/0071057, 2011/0059873, 2011/0059872, 2011/0048721, 2010/0319920, 2010/0292110, and 2017/0198202, and U.S. patent application Ser. Nos. 16/922,999, 16/922,993, 16/922,997, 16/923,000 each of which is hereby incorporated by reference herein in its entirety for its description of example surfactants.

EXAMPLES

The examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, percents associated with components of compositions are percent by weight, based on the total weight of the composition including the components, temperature is in ° C. or is at ambient temperature, and pressure is at or near atmospheric.

Example 1

Evaluation of Defoamers vs. 0.15% Surfactant in Injection Brine Using Overhead Mixer Method Methods Defoamers tested: Defoamer 1 is a siloxane-based defoamer, Defoamer 2 is a ketone based defoamer, Defoamer 3 is 4-methyl 2-pentanol, and blends. Test conditions: Temperatures: 22° C., Foam reduction potential defined by fr %=100(ifv−efr)/ify (fR %: foam reduction, ifv: initial foam volume, efv: ending foam volume), or if heights are used, the definition is fr %=100(ifh−efh)/(fr %: foam reduction, ifh: initial foam height, efh: ending foam height).

Results and Discussion

Figure 4:
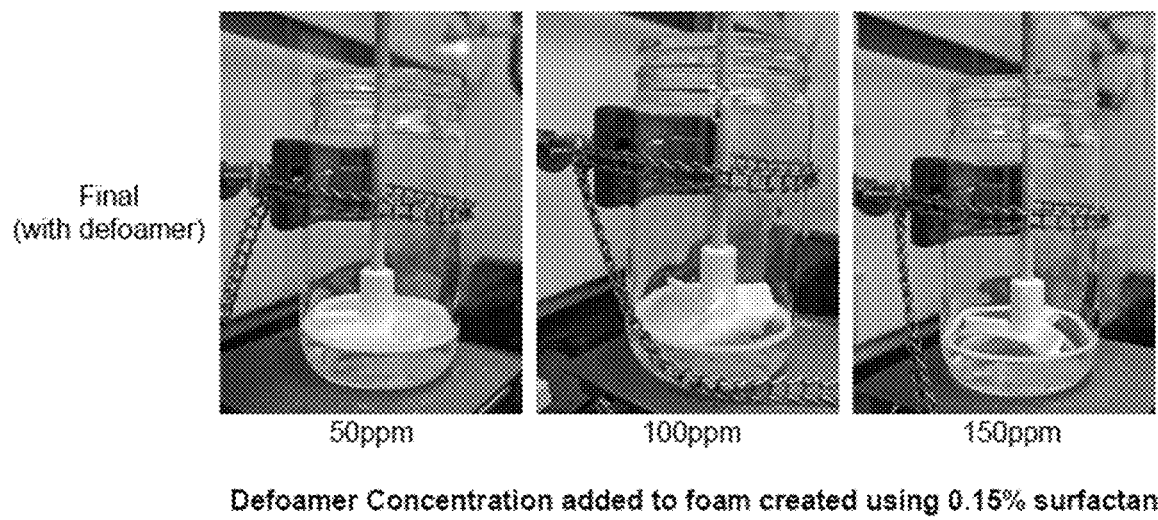
FIG. 4 includes images illustrating the results of a 50/50 blend of defoamer 1 and 4-methyl 2-pentanol.
Figure 5:
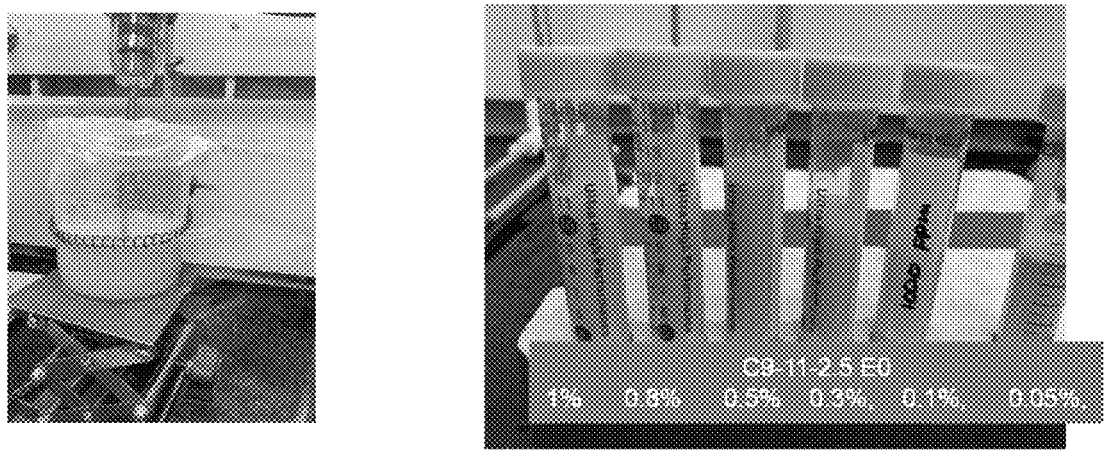
FIG. 5 includes images illustrating the results of using different concentrations of C9-11-2.5EO as partitioning agent for sample emulsion compositions including: 0.2% surfactant solution in injection brine and 10% oil.
Figure 6:
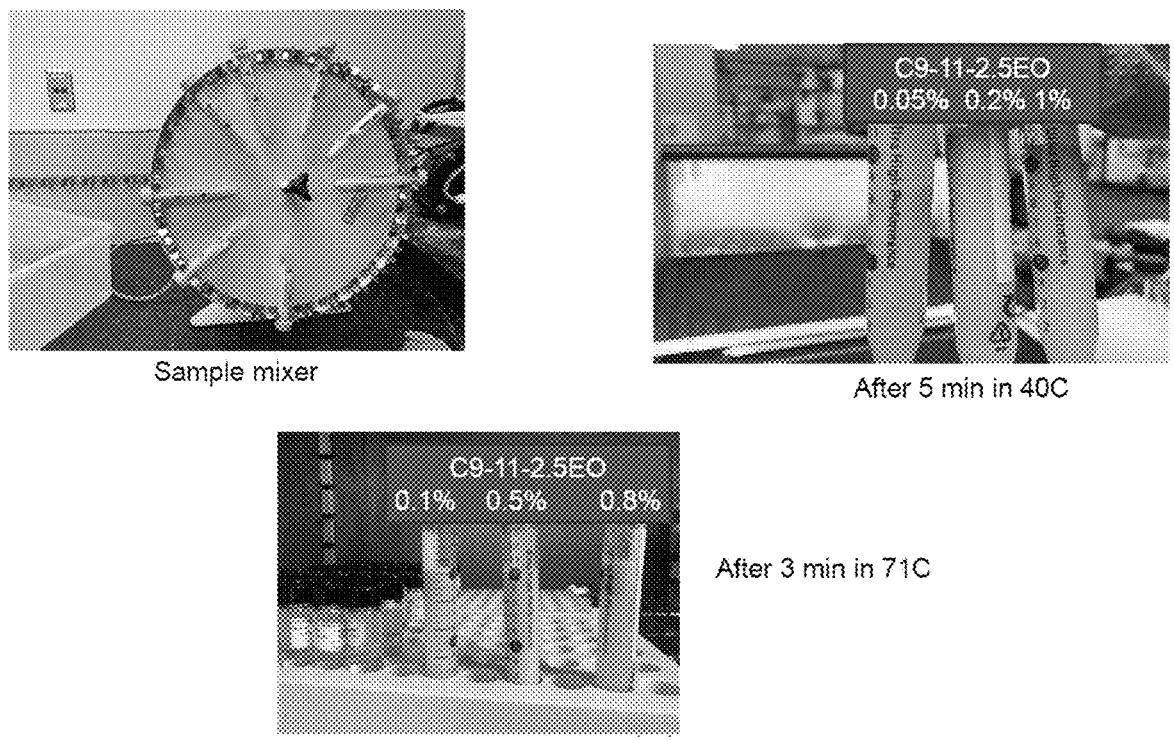
FIG. 6 includes images illustrating the results of using different concentrations of C9-11-2.5EO as partitioning agent for sample emulsion compositions including: 0.2% surfactant solution in injection brine and 10% oil at 40° C. The images were taken after 5 minutes.
Figure 7:
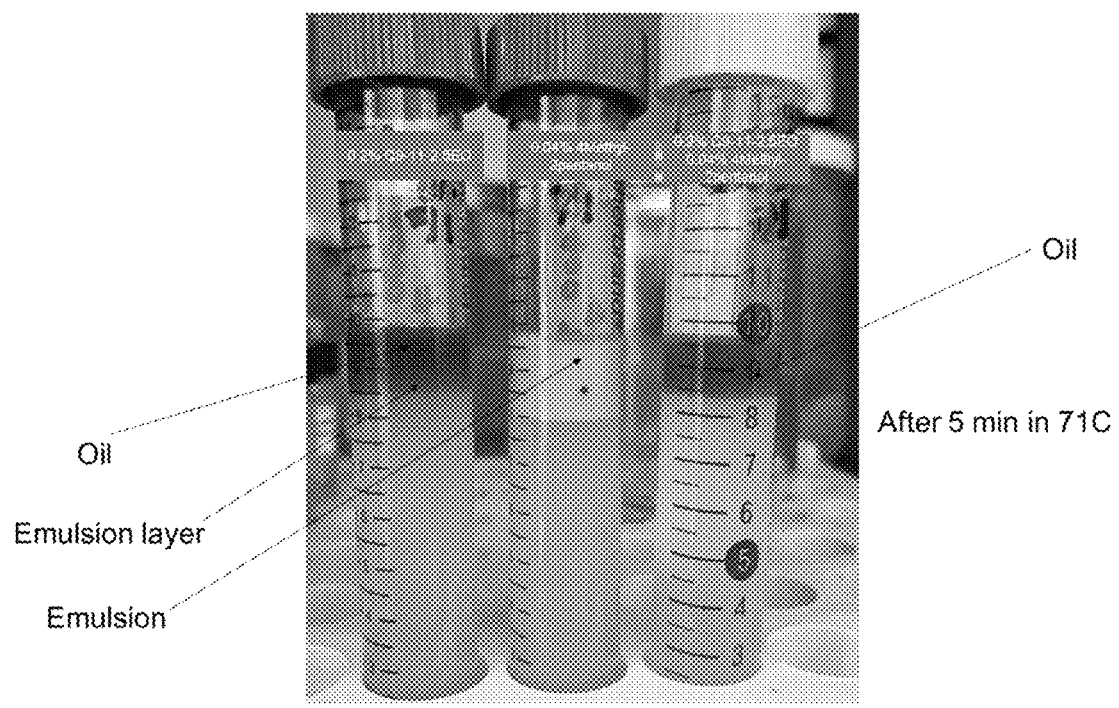
FIG. 7 is an image illustrating the results of using different concentration of C9-11-2.5EO at different temperatures and time duration.
Figure 8:
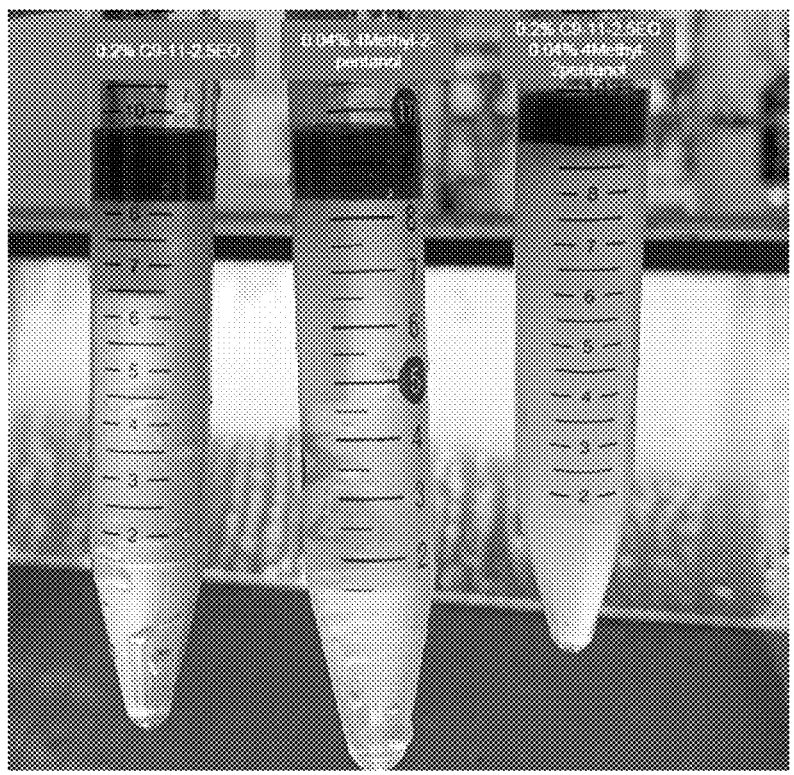
FIG. 8 is an image illustrating the results of using 0.2% C9-11-2.5EO, 0.04% 4-methyl 2-pentanol, and a blend of 0.2% C9-11-2.5EO and 0.04% 4-methyl 2-pentanol as partitioning agents, at 71° C. The image was taken after 5 minutes.

Results are shown in FIG. 1-4. FIG. 1 demonstrates that 4-methyl 2-pentanol by itself worked as a defoamer for foam created with 0.15% surfactant. Additionally using 4-methyl 2-pentanol with defoamer 1 (siloxane-based defoamer) or defoamer 2 (methyl isobutyl ketone) improved the defoaming capability (see FIGS. 3-4). The performance is improved with a 1:1 blend of 4-methyl 2-pentanol and defoamer 1. The 1:1 blend of defoamer 1 and 4-methyl 2-pentanol exhibited strong defoaming behavior at a concentration of 100ppm as shown in FIG. 4. The ratio in the blend can be altered to vary the effective concentration at which the breaking compositions exhibit strong defoaming behaviors.

Example 2

Evaluation of 4-methyl-2-pentanol, IPA, Non-Ionic Surfactant and Blends as Demulsifiers Methods Chemical free oil being studied is mixed with either synthetic water based upon its water analysis (containing surfactant, polymer, etc.), or mixed with a field water according to its producing oil/water ratio at the shear location and temperature (e.g., downhole production).

For the downhole ESP pump area, the mixtures are stirred using a laboratory mixer at 3400-3600 rpm for approximately 2 minutes in a 2000 ml plastic beaker. The blades (high shear) of the mixer should be about ⅓ from the bottom of the beaker. For other areas with downhole lifting mechanisms, specific mixing should be developed to correctly simulate the producing shearing conditions. When making emulsion, lots of foam was generated, therefore 0.01% defoamer was added to break the foam before test was started (see FIG. 11).

Using the graduated volume lines on the prescription bottles or centrifuge tubes place 10-100 ml of oil/emulsifier mixture into the bottles. Add the required dosage of treating chemicals to be evaluated. The number of containers used for testing will be x+1, x being the number of chemicals being evaluated and the extra bottle being the control. Cap each bottle well and shake 100 times. Place the bottles in a water bath at the required temperature. The water level should be higher than the level of the fluids in the bottle.

Check the oil/water separation half-hourly for up to six hours. Continue until there is no change in the separation. Sometimes it may take longer. Compare the bottles to determine the effect of the demulsifier and/or amount of the demulsifier.

Results and Discussion

Results demonstrate that 4-methyl-2-pentanol, IPA, nonionic surfactant, or blends of 4-methyl-2-pentanol and nonionic surfactant can be used as demulsifiers.

Example 3

Evaluation of Alcohol Based (Partitioning Agent) Emulsion and Foam Breakers

Material:
Formulations tested: Formulation #1: 0.1% alkoxylated C6-C18 alcohol and 0.1% disulfonate, Formulation #2: 0.2% alkoxylated C6-C18 alcohol and 0.06% disulfonate, Formulation #3: 0.12% alkoxylated C6-C18 alcohol and 0.08% disulfonate, Formulation #4: 0.12% alkoxylated C6-C32 Guerbet alcohol and 0.08% disulfonate. Partitioning agents tested: refer to FIG. 13.

Demulsifiers (Emulsion Breakers)
Methods

Chemical free oil being studied is mixed with either synthetic water based upon its water analysis (containing surfactant, polymer, etc.), or mixed with a field water according to its producing oil/water ratio at the shear location and temperature (Ex. downhole production).

For the downhole ESP pump area, the mixtures are stirred using a laboratory mixer at 3400-3600 rpm for approximately 2 minutes in a 2000 ml plastic beaker. The blades (high shear) of the mixer should be about ⅓ from the bottom of the beaker. For other areas with downhole lifting mechanisms, specific mixing should be developed to correctly simulate the producing shearing conditions. When making emulsion, lots of foam was generated, therefore 0.01% defoamer was added to break the foam before test was started (see FIG. 11).

Using the graduated volume lines on the prescription bottles or centrifuge tubes place 10-100 ml of oil/emulsifier mixture into the bottles. Add the required dosage of treating chemicals to be evaluated. The number of containers used for testing will be x+1, x being the number of chemicals being evaluated and the extra bottle being the control. Cap each bottle well and shake 100 times. Place the bottles in a water bath at the required temperature. The water level should be higher than the level of the fluids in the bottle.

Check the oil/water separation half-hourly for up to six hours. Continue until there is no change in the separation. Sometimes it may take longer. Compare the bottles to determine the effect of the demulsifier and/or amount of the demulsifier.

Results and Discussion

C9-11-2.5EO was tested as an emulsion breaker for an emulsion made using 0.2% surfactant formulation #1 with 10% oil at both 40° C. and 73° C. Results show that 0.3% of emulsion breaker give promising results within 5 minutes at 73° C. (see FIG. 14).

Figure 15:
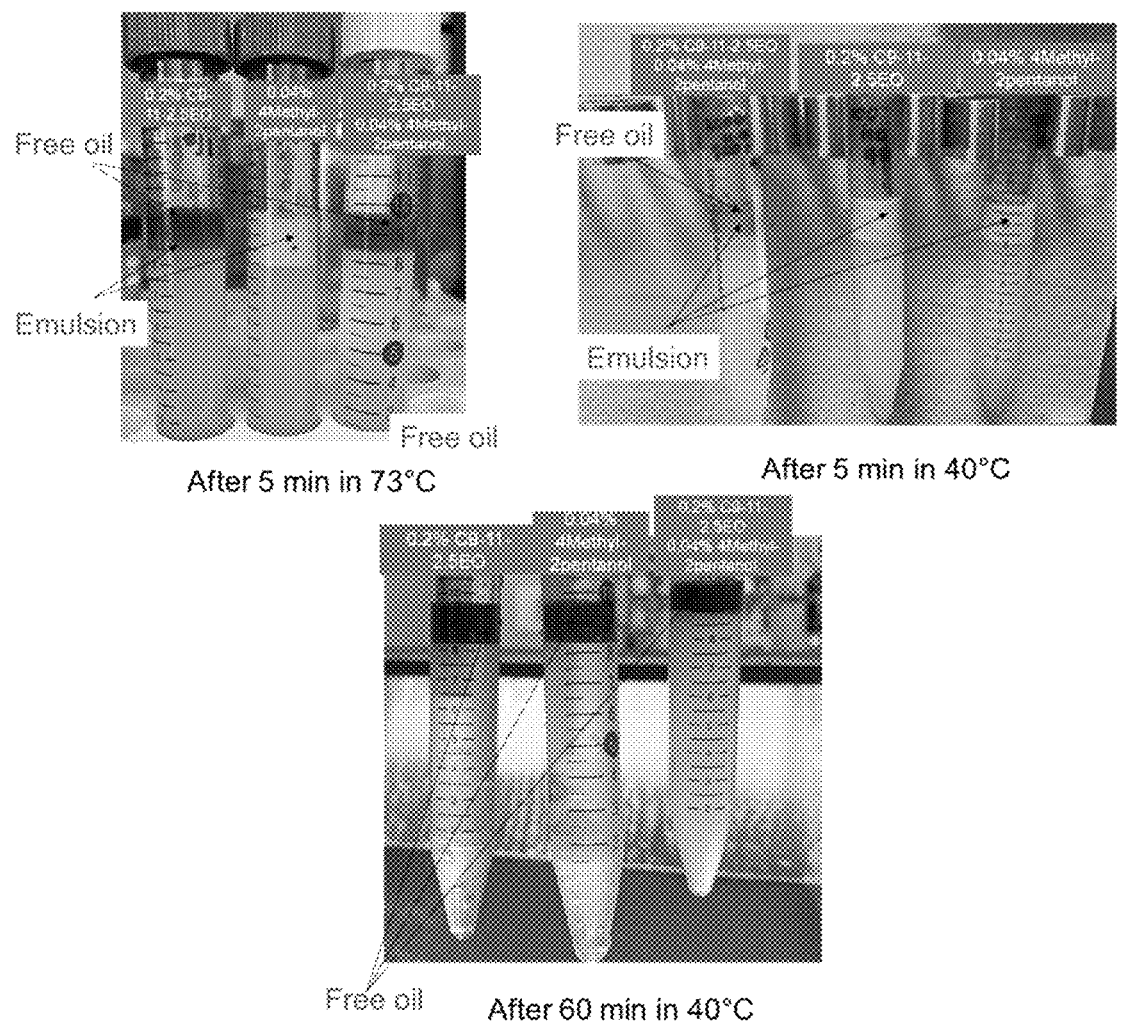
FIG. 15 includes images illustrating the results of using a 0.2% C9-11 2.5EO, 0.04% 4-Methyl-2-Pentanol and a blend of 0.2% C9-11 2.5EO and 0.04% 4-Methyl-2-Pentanol as partitioning agents for a sample emulsion composition including 0.2% surfactant formulation #1 with 10% oil. Images were taken after 5 minutes in 40° C. and 73° C. and 60 minutes in 40° C.
Figure 16:
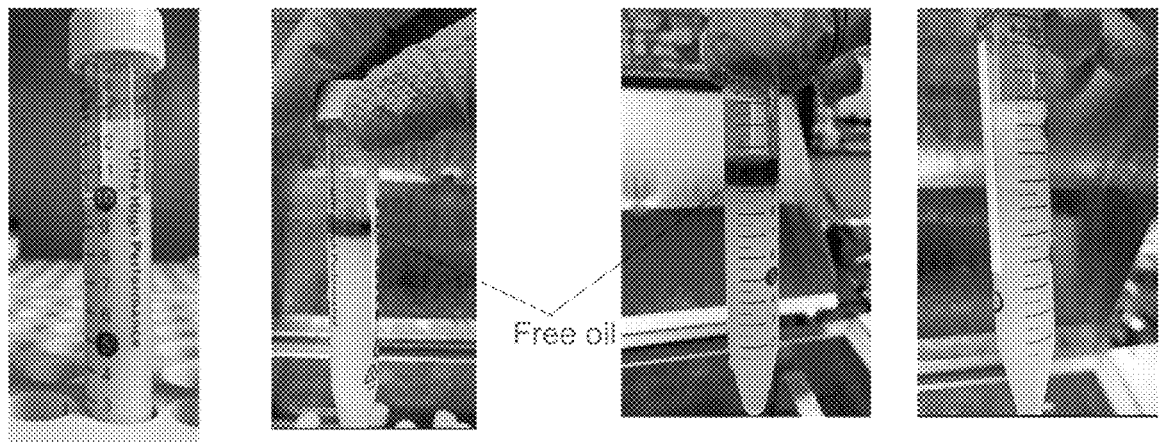
FIG. 16 includes images illustrating the results of only using 0.2% 4-Methyl-2-Pentanol as partitioning agent for a sample emulsion composition including 0.2% surfactant formulation #1.

A blend of C9-11 2.5EO and 4-Methyl-2-Pentanol as an Emulsion Breaker was tested for an emulsion made using 0.2% surfactant formulation #1 with 10% oil. The results show that a blend of 0.2% C9-11 2.5EO and 0.04% 4-Methyl-2-Pentanol blend work better at 73° C. for 5 minutes compared to the single components. All three samples (0.2% C9-11 2.5EO, 0.04% 4-Methyl-2-Pentanol, and the blend 0.2% C9-11 2.5EO and 0.04% 4-Methyl-2-Pentanol) work similarly at 40° C. and longer time duration (60 minutes) (see FIG. 15).

Figure 17:
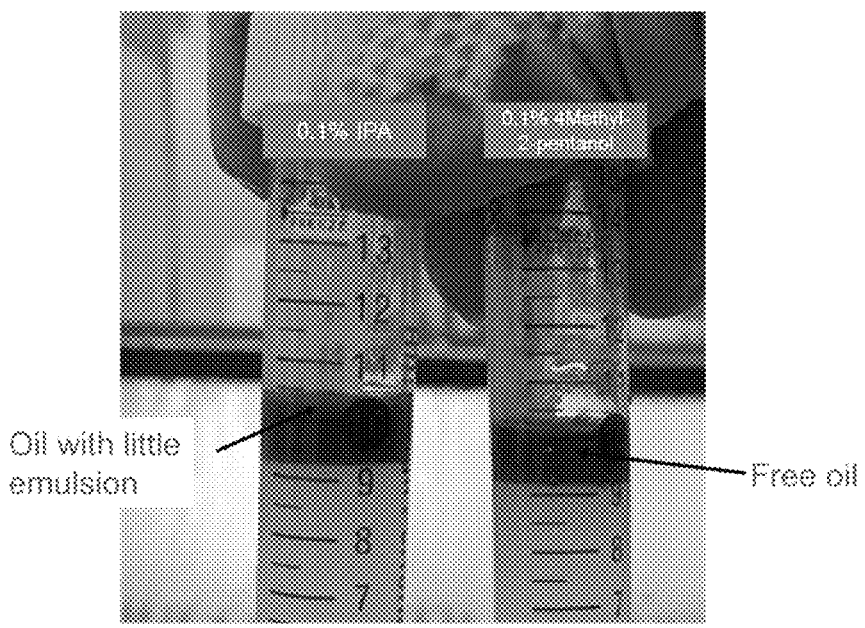
FIG. 17 is an image illustrating the results of comparing IPA versus 4-methyl-2-pentanol as partitioning agents in a sample emulsion composition including 0.2% surfactant formulation #1.
Figure 19:
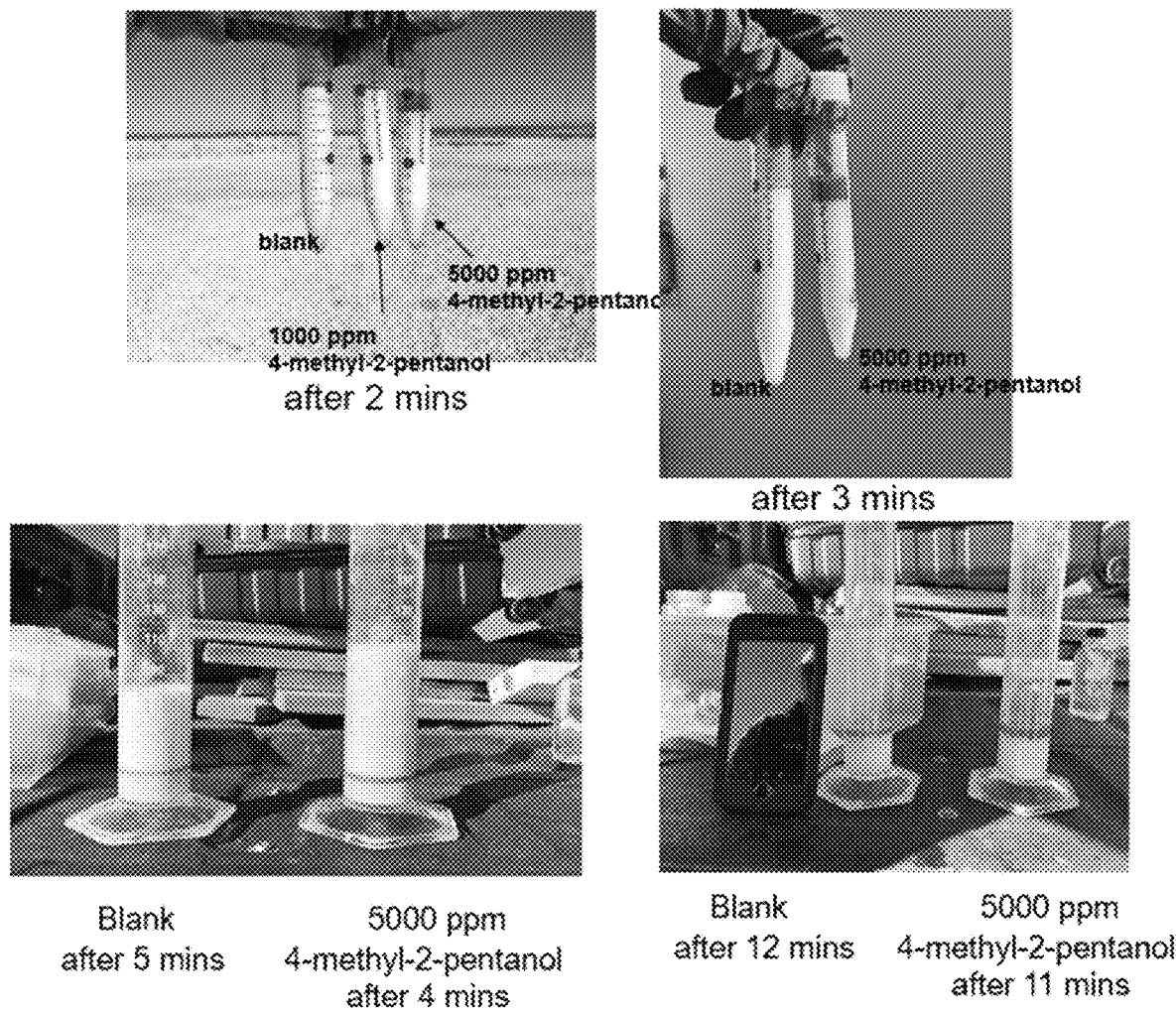
FIG. 19 includes images illustrating the field testing results of using 4-Methyl-2-Pentanol as partitioning agent in sample emulsion composition including surfactant formulation #1 at different time points.
Figure 20:
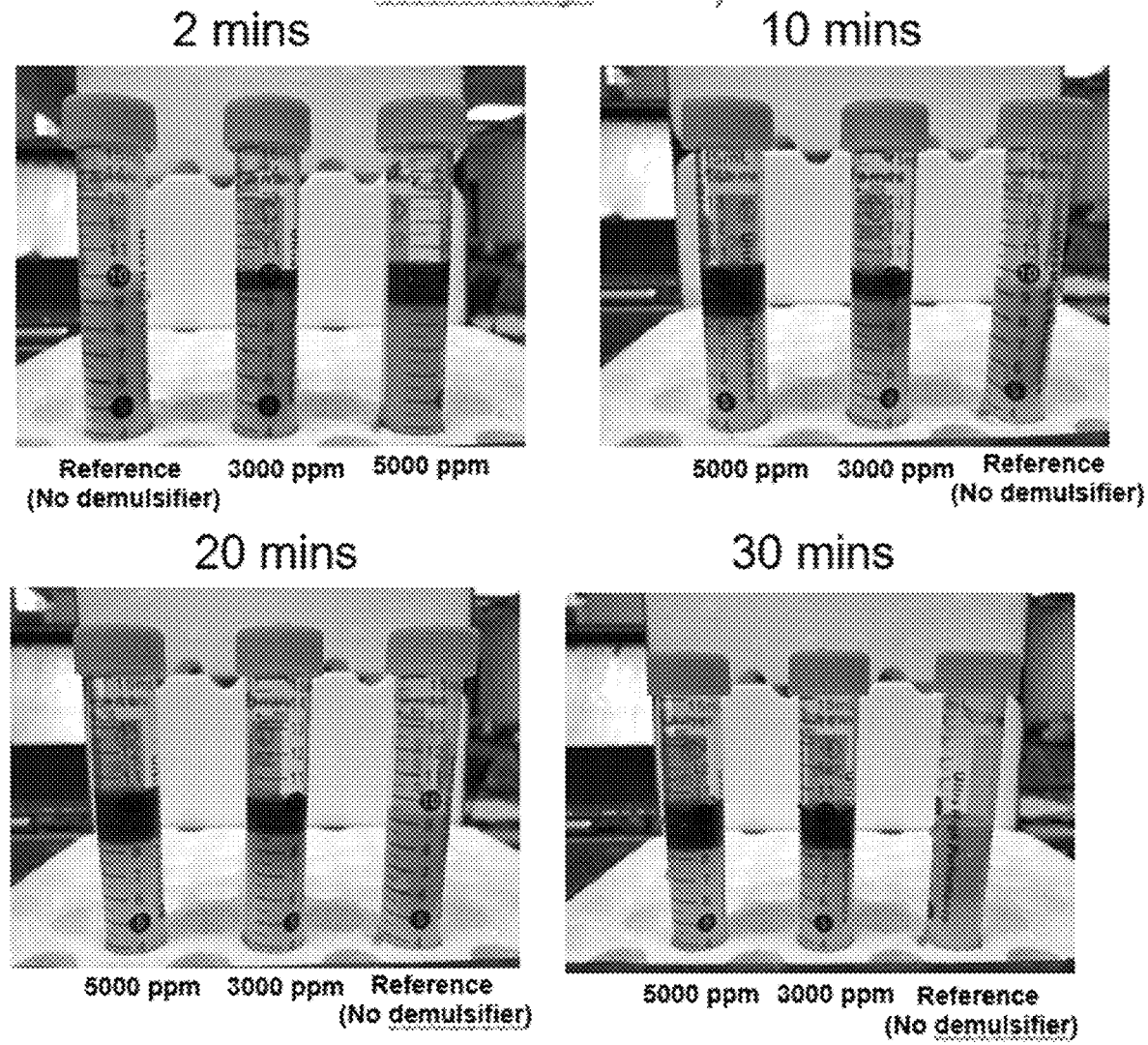
FIG. 20 includes images illustrating demulsification results using 3000 ppm and 5000 ppm EGBE (Ethylene Glycol monobutyl Ether) as the partitioning agent in a sample emulsion composition including 0.2% surfactant formulation #1, 20% oil at 40° C., and brine #1. The images were taken after 2, 10, 20, and 30 minutes.
Figure 21:
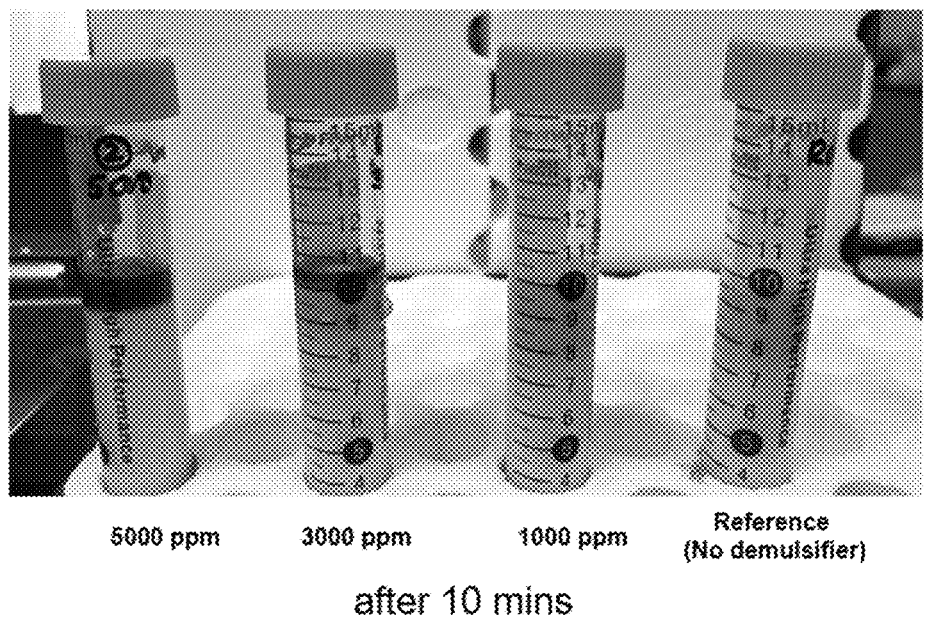
FIG. 21 is an image illustrating demulsification using 1000 ppm, 3000 ppm, and 5000 ppm TEGBE (Triethylene glycol monobutyl Ether) as the partitioning agent in a sample emulsion composition including 0.2% surfactant formulation #1, 20% oil at 40° C. The image was taken after 10 minutes.
Figure 23:
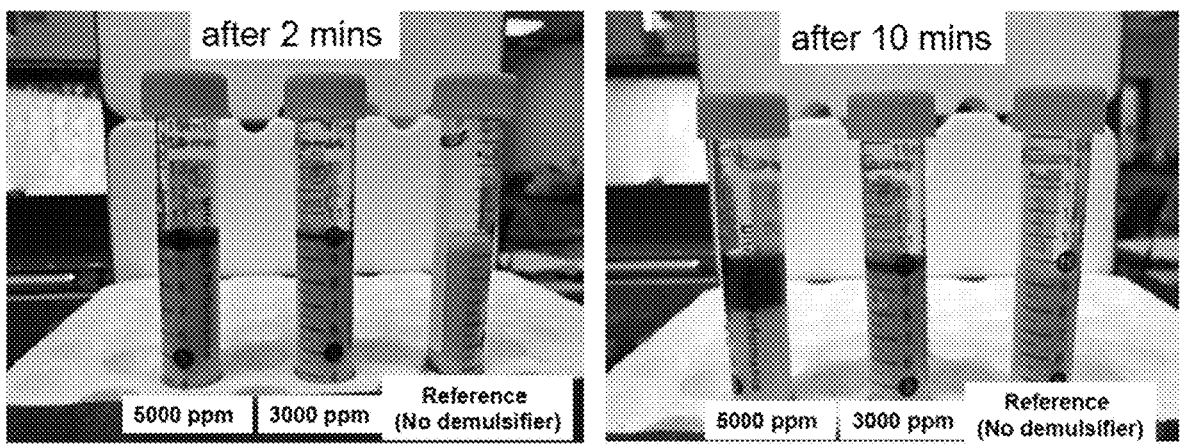
FIG. 23 includes images illustrating demulsification results using 3000 ppm and 5000 ppm PGBE (Propylene Glycol Butyl Ether) as the partitioning agent in a sample emulsion composition including 0.2% surfactant formulation #1, 20% oil at 40° C., and brine #1. The images were taken after 2 and 10 minutes.
Figure 22:
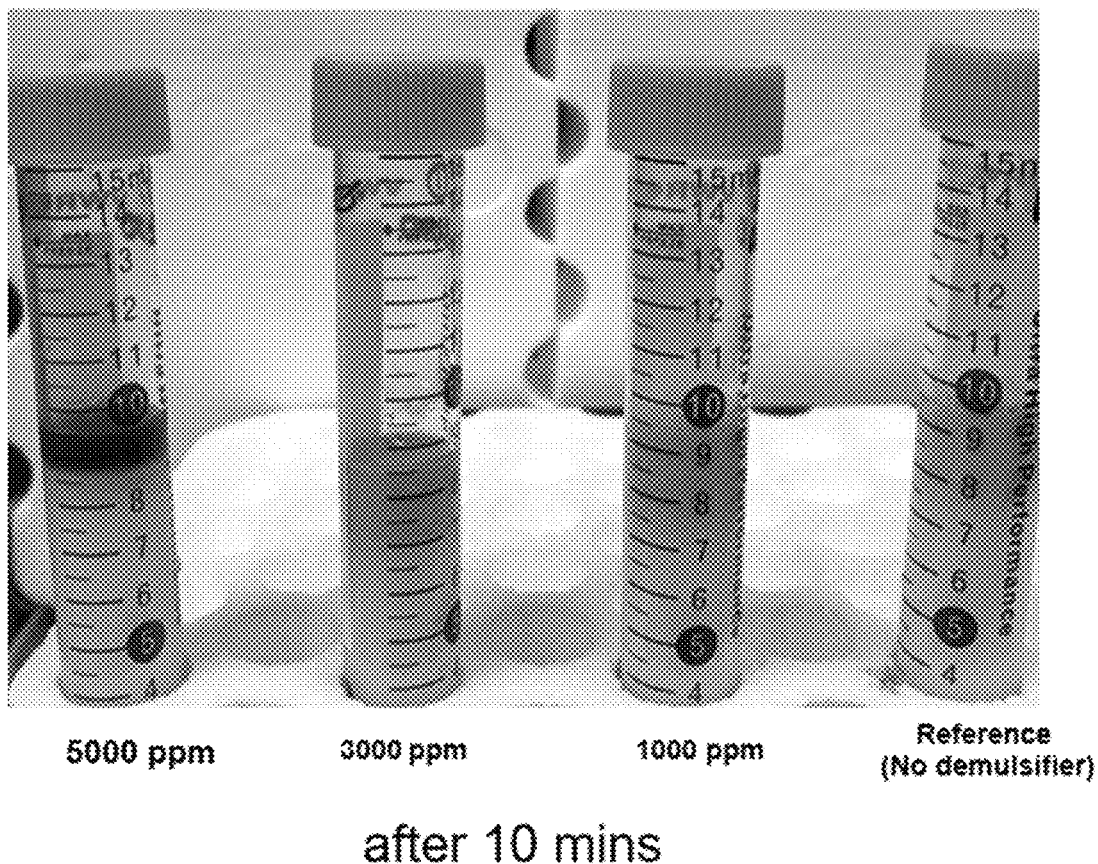
FIG. 22 is an image illustrating demulsification results using 1000 ppm, 3000 ppm, and 5000 ppm DGBE (Diethylene Glycol Butyl Ether) as the partitioning agent in a sample emulsion composition including 0.2% surfactant formulation #1, 20% oil at 40° C., and brine #1. The images were taken after 10 minutes.
Figure 24:
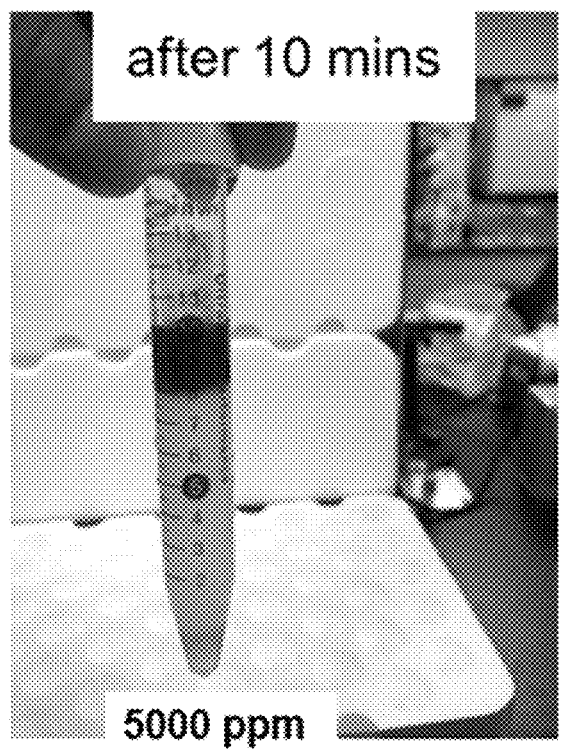
FIG. 24 is an image illustrating demulsification results using 5000 ppm EGPhE (Ethylene Glycol Monophenyl Ether) as the partitioning agent in a sample emulsion composition including 0.2% surfactant formulation #1, 20% oil at 40° C., and brine #1. The images were taken after 10 minutes.
Figure 25:
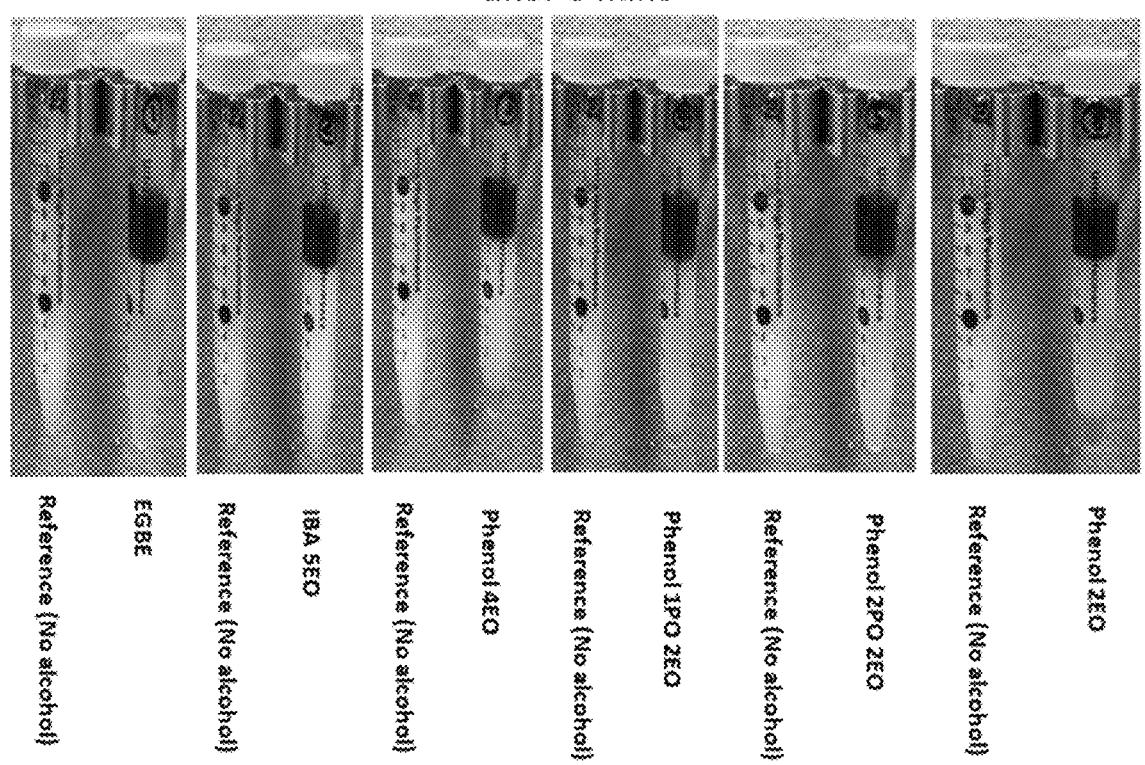
FIG. 25 includes images illustrating demulsification results using 5000 ppm phenol-2EO, phenol-4EO, phenol-2PO-2EO, phenol-1PO-2EO, IBA 5EO, and EGBE as partitioning agents in a sample emulsion composition including 0.2% surfactant formulation #1, 20% oil #1 at 40° C., and brine #1. The images were taken after 3 minutes.

4-mthyl-2-pentanol and IPA emulsion breakers were tested individually. FIG. 17 shows that 0.1% of 4-methyl-2-pentanol generated a cleaner pure oil compared to 0.1% IPA.

Results of demulsification using one of the following demulsification alcohols: ethylene glycol monobutyl ether, ethylene glycol monophenyl ether, triethylene glycol monobutyl ether, diethylene glycol butyl ether, propylene glycol butyl ether, phenol-2EO, phenol-4EO, phenol-2PO-2EO, phenol-1PO-2EO, or IBA 5EO for an emulsion including: 0.2% Surfactant Formulation #1, 20% Oil #1 at 40° C., and brine #1 are shown in FIGS. 20-25.

Figure 26:
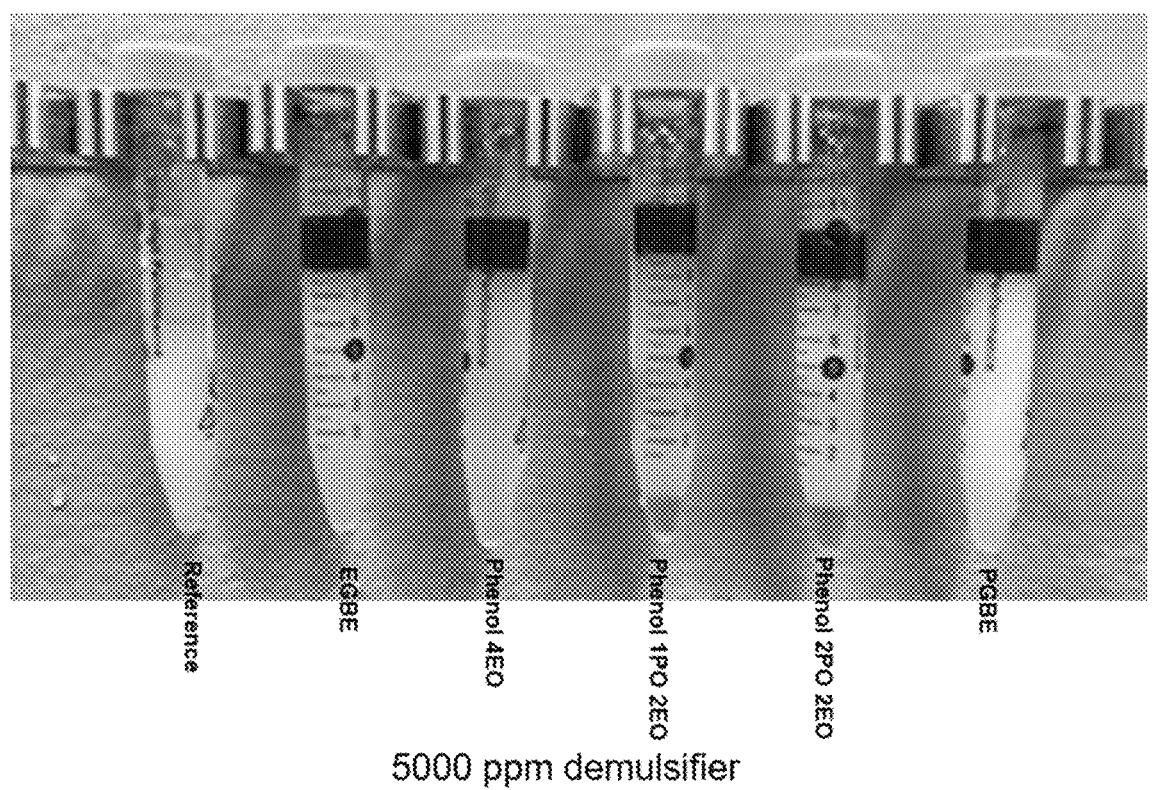
FIG. 26 is an image illustrating demulsification results using 5000 ppm of PGBE, phenol-4EO, phenol-2PO-2EO, phenol-1PO-2EO, and EGBE as partitioning agents in a sample emulsion composition including 0.26% surfactant formulation #2, 20% oil #1 at 40° C. The images were taken after 10 minutes.

FIG. 26 shows the results of demulsification using one of the following demulsification alcohols: propylene glycol butyl ether, phenol-4EO, phenol-2PO-2EO, phenol-1PO-2EO, or ethylene glycol monobutyl ether for an emulsion composition including: 0.26% Surfactant Formulation #2, 20% Oil #1 at 40° C. for 10 minutes. The data in FIG. 26 demonstrates that all the portioning agents tested were effective as demulsifiers.

Figure 27:
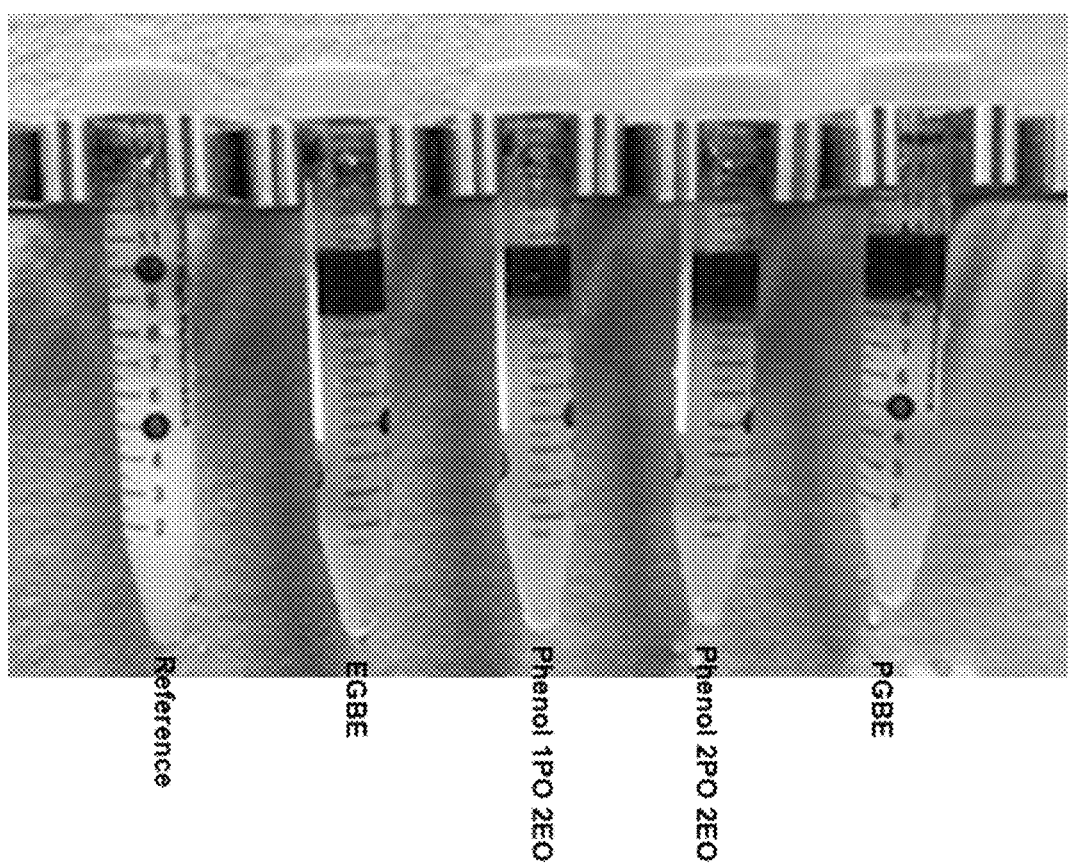
FIG. 27 is an image illustrating demulsification results using 5000 ppm of PGBE, phenol-2PO-2EO, phenol-1PO-2EO, and EGBE as partitioning agents in a sample emulsion composition including 0.18% surfactant formulation #3, 20% oil #2 at 40° C. The images were taken after 10 minutes.

FIG. 27 shows the results of demulsification using one of the following demulsification alcohols: propylene glycol butyl ether, phenol-2PO-2EO, phenol-1PO-2EO, or ethylene glycol monobutyl ether for an emulsion including: 0.18% Surfactant Formulation #3, 20% Oil #2 at 40° C. for 10 minutes. The data in FIG. 27 demonstrates that all the portioning agents tested were effective as demulsifiers.

Figure 28:
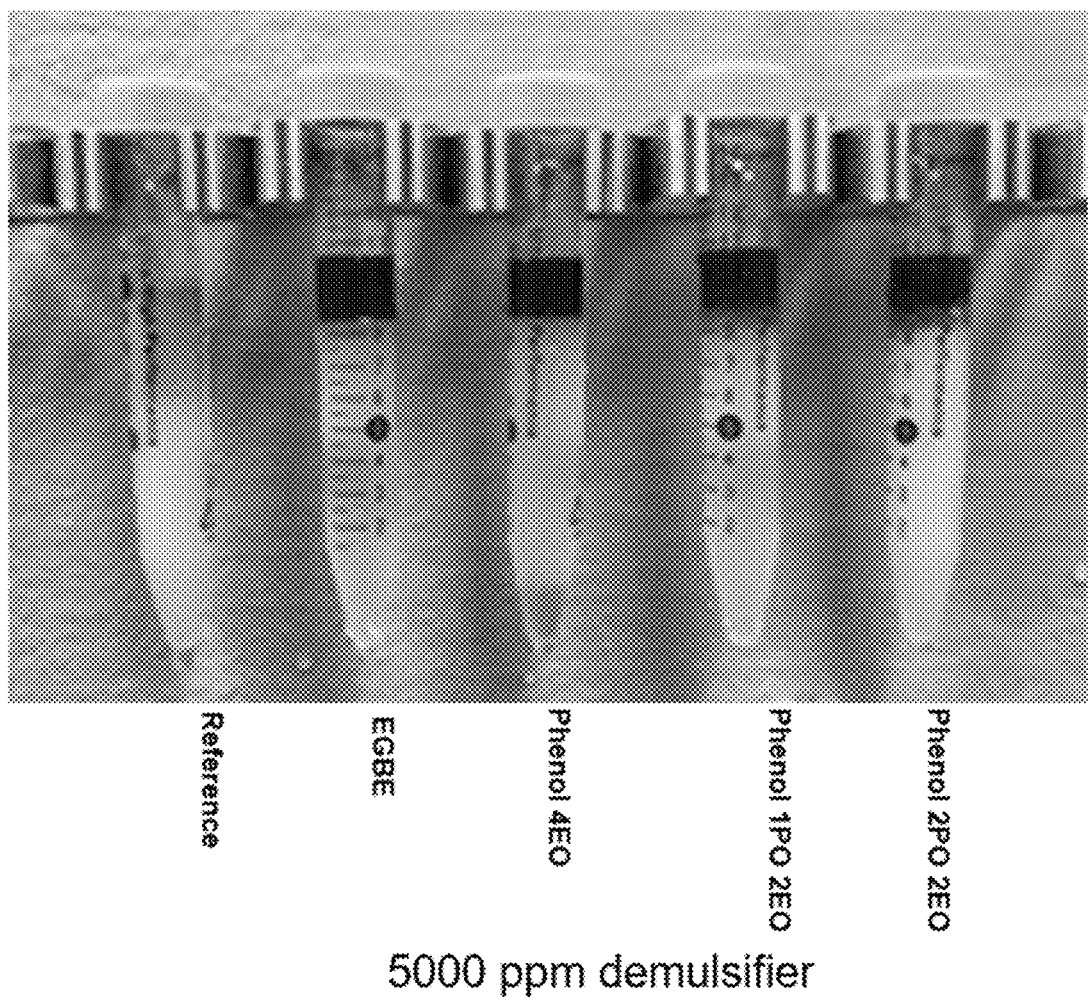
FIG. 28 is an image illustrating demulsification results using 5000 ppm of phenol-2PO-2EO, phenol-1PO-2EO, phenol-4EO, and EGBE as partitioning agents in a sample emulsion composition including 0.18% surfactant formulation #4, 20% oil #3 at 40° C. The images were taken after 10 minutes.
Figure 29:
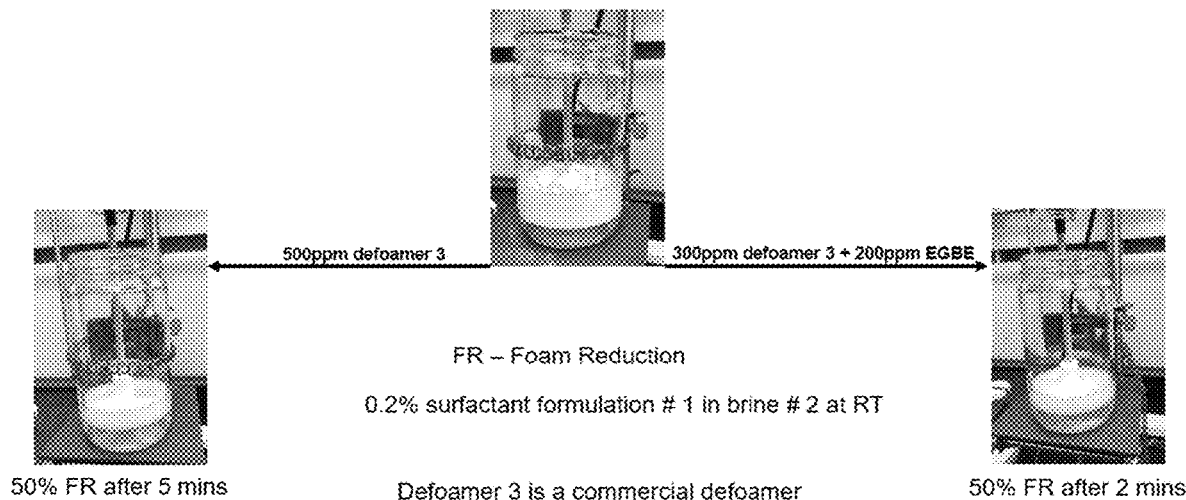
FIG. 29 includes images illustrating the improved performance of defoamer 3 when 200 ppm EGBE present.

FIG. 28 shows, the results of demulsification using one of the following demulsification alcohols phenol-2PO-2EO, phenol-1PO-2EO, or ethylene glycol monobutyl ether for an emulsion including: 0.18% Surfactant Formulation #4, 20% Oil #3 at 40° C. for 10 minutes are shown in FIG. 28. The data in FIG. 28 demonstrates that all the portioning agents tested were effective as demulsifiers.

Figures 32, 33:
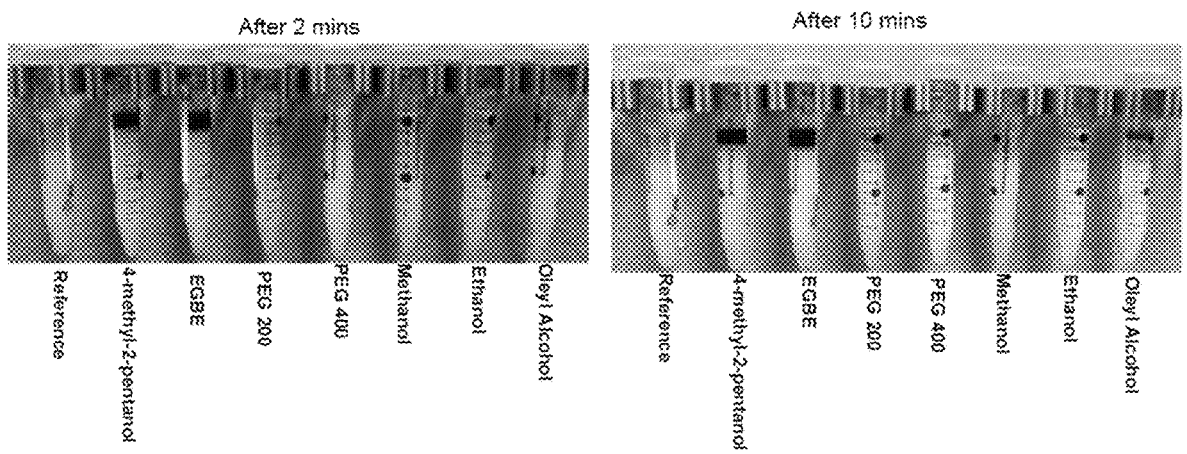
FIG. 32 includes images illustrating results using oleyl alcohol, ethanol, methanol, PEG 400, PEG 200, EGBE, and 4-methyl-2-pentanol as partitioning agents in a sample emulsion composition including formulation #3 and 20% oil #3 at 40° C. The images were taken after 2 and 10 minutes.
FIG. 33 is a table of the defoamers tested in Example 3.

FIG. 32 shows, the results of demulsification using for the following alcohols oleyl alcohol, ethanol, methanol, PEG400, PEG 200, EGBE, and 4-methyl-2-pentanol for an emulsion including: formulation #3 and 20% Oil #3 at 40° C. The data demonstrates that partitioning agents with partition coefficients (Log $K_{ow}$) of less than zero or higher than 5 are not effective demulsifiers for the formulations described.

Defoamers (Foam Breakers)

Materials

Defoamers tested are described in FIG. 33. Test conditions: Temperatures: 22° C., Foam reduction potential defined by fr %=100(ifv−efr)/ifv (fr %: foam reduction, ifv: initial foam volume, efv: ending foam volume), or if heights are used, the definition is fr %=100 (ifh−efh)/ifh (fr %: foam reduction, ifh: initial foam height, efh: ending foam height).

Methods 100 mL of surfactant solution was added to a 1000 ml glass jar and overhead mixture was placed into the surfactant mixture. Surfactant solution was mixed at 200 rpm for 1 minute. After setting up the safety shield surfactant solution was mixed at 2000 rpm for 30 seconds to generate foam and overhead mixture was stopped. Initial foam height was recorded after 3 minutes. After adding target amount of defoaming agent, the solution was mixed at 400 rpm for 1 minute. Foam height was recorded over time. Final reading was recorded after 5 minutes.

Results and Discussion Ethylene glycol monobutyl ether (EGBE) improved the performance of Defoamer 3 in a 0.2% surfactant formulation #1 in brine at room temperature. 200 ppm EGBE and 300 ppm Defoamer 3 had a 50% foam reduction after 2 minutes compared to 500 ppm Defoamer 3 with a 50% foam reduction after 5 minutes.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

By way of non-limiting illustration, examples of certain embodiments of the present disclosure are given below.

What we claim is:

1. A method of breaking a foam, emulsion, or any combination thereof, the method comprising:
contacting the foam, emulsion, or any combination thereof with a breaking composition, wherein the breaking composition comprising a partitioning agent; wherein the partitioning agent has a octanol/water partition coefficient ([P]) at 25°, and wherein the log of the partition coefficient at 25° (log[P]) is from 0.1 to 5.

2. The method of claim 1, wherein the partitioning agent has a dielectric constant of from 1 to 50.

3. The method of claim 1, wherein the partitioning agent comprises an alcohol, an ether, a non-ionic surfactant, or any combination thereof.

4. The method of claim 3, wherein the partitioning agent comprises an alcohol, and wherein the alcohol comprises a branched C3-C10 alcohol.

5. The method of claim 3, wherein the partitioning agent comprises an ether, and wherein the ether comprises an alkyl alkoxylate defined by the formula below $R^1$-Z(BO)-Y(PO)-X(EO)

wherein
$R^1$ represents a branched or unbranched $C_1$-$C_6$ alkyl group or a phenyl group;
Z represents an integer from 0 to 35;
BO represents a butoxy group;
Y represents an integer from 0 to 35;
PO represents a propoxy group;
X represents an integer from 1 to 50; and
EO represents an ethoxy group.

6. The method of claim 3, wherein the partitioning agent comprises a non-ionic surfactant, and wherein the non-ionic surfactant is defined by the formula below $R^2$-Z(BO)-Y(PO)-X(EO)

wherein
$R^2$ represents a branched or unbranched hydrophobic carbon chain having 7-32 carbon atoms;
Z represents an integer from 0 to 35;
BO represents a butoxy group;
Y represents an integer from 0 to 35;
PO represents a propoxy group;
X represents an integer from 1 to 50; and
EO represents an ethoxy group.

7. The method of claim 3, wherein partitioning agent comprises hexanol, isopropanol, 2-ethylhexanol, 4-methyl-2-pentanol, benzyl alcohol, isobutanol, sec-butanol, tert-butanol, pentaerythritol, ethylene glycol, ethylene glycol butyl ether (EGBE), diethylene glycol monobutyl ether (DGBE), triethylene glycol monobutyl ether (TEGBE), ethylene glycol dibutyl ether (EGDE), propylene glycol butyl ether, ethylene glycol monophenyl ether, phenol-2EO, phenol-4EO, phenol-1PO-2EO, phenol-2PO-2EO, a C8-C16 alkyl ethoxylate, or any combination thereof.

8. The method of claim 1, wherein the breaking composition further comprises one or more defoamers, demulsifiers, or any combination thereof.

9. The method of claim 8, wherein the one or more defoamers, demulsifiers, or any combination thereof comprise an oil-based defoamer, a water-based defoamer, a silicone-based defoamer, an alkyleneoxy-based defoamer, a polyacrylate defoamer, a ketone-based defoamer, a phenol-formaldehyde resin, an acid-catalyzed phenol-formaldehyde resin, a base-catalyzed phenol-formaldehyde resin, an epoxy resin, a polyamine, a polyol, a di-epoxide, a dendrimer, a star polymer, a zwitterionic surfactant, a cationic surfactant, or a combination thereof.

10. The method of claim 9, wherein the one or more defoamers, demulsifiers, or any combination thereof comprise an oligo- and/or polysiloxane, polydimethylsiloxane, decamethylpentasiloxane, an organo-modified silicone, octamethylcyclotetrasiloxane, a silicone polyalkyleneoxide, a silicone glycol, a silicone co-polymer, a fluorosiloxane (e.g., trifluoropropylmethylsiloxane), a trimethylsiloxy-terminated polydimethylsiloxane, a trimethylsiloxy-terminated trifluoropropylmethylsiloxane, a alkylaryl siloxane, a polyether-modified polysiloxane, or any combination thereof.

11. The method of claim 1, wherein the foam, the emulsion, or any combination thereof is present on or within equipment associated with an oil and gas operation.

12. The method of claim 11, wherein the foam, the emulsion, or any combination thereof is present in a separator, and wherein the method comprises injecting the breaking composition into the separator, injecting the breaking composition upstream of the separator, injecting the breaking composition downstream of the separator, or any combination thereof.

13. The method of claim 12, wherein the foam, the emulsion, or any combination thereof is present in a pipe, in a pipeline, in a wellhead, or any combination thereof, and wherein the method comprises injecting the breaking composition into the pipe, into the pipeline, into the wellhead, or any combination thereof.

14. The method of claim 13, wherein the method comprises continuous injecting the breaking composition.

15. The method of claim 1, wherein the foam, the emulsion, or any combination thereof comprises a produced fluid.

16. The method of claim 15, wherein the produced fluid comprises an aqueous component, a hydrocarbon component, and one or more surfactants.

17. The method of claim 16, wherein the one or more surfactants comprises one or more non-ionic surfactants, one or more anionic surfactants, one or more cationic surfactants, one or more zwitterionic surfactants, or any combination thereof.

18. The method of claim 17, wherein the one or more surfactants comprise one or more non-ionic surfactants, and
wherein the one or more non-ionic surfactants comprises a branched or unbranched C6-C32:PO(0-65):EO(0-100), a branched or unbranched C6-C30:PO(30-40):EO(25-35), a branched or unbranched C6-C12:PO(30-40):EO(25-35), or a branched or unbranched C6-C30:EO(8-30).

19. The method of claim 17, wherein the one or more surfactants comprise one or more anionic surfactants, and
wherein the one or more anionic surfactant comprise one or more of the following:
a branched or unbranched C6-C32:PO(0-65):EO(0-110)-carboxylate, a branched or unbranched C6-C30:PO(30-40):EO(25-35)-carboxylate, a branched or unbranched C6-C12:PO(30-40):EO(25-35)-carboxylate, or a branched or unbranched C6-C30:EO(8-30)-carboxylate;
a C8-C30 alkyl benzene sulfonate (ABS);
an internal olefin sulfonate (IOS);
an isomerized olefin sulfonate;
an alfa olefin sulfonate (AOS),
a sulfosuccinate surfactant;
an alcohol sulfate surfactant;
an alkoxy sulfate surfactant;
a surfactant defined by the formula below $R^1\text{-}R^2\text{-}R^3$ wherein
$R^1$ comprises a branched or unbranched, saturated or unsaturated, cyclic or non-cyclic, hydrophobic carbon chain having 6-32 carbon atoms and an oxygen atom linking $R^1$ and $R^2$;
$R^2$ comprises an alkoxylated chain comprising at least one oxide group selected from the group consisting of ethylene oxide, propylene oxide, butylene oxide, and any combination thereof; and
$R^3$ comprises a branched or unbranched hydrocarbon chain comprising 2-12 carbon atoms and from 2 to 5 carboxylate groups;
a surfactant defined by the formula below

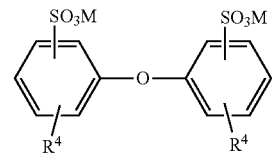

wherein
$R^4$ is, individually for each occurrence, a branched or unbranched, saturated or unsaturated, cyclic or non-cyclic, hydrophobic carbon chain having 6-32 carbon atoms; and
M represents a counterion;
or any combination thereof.

* * * * *